US011991751B2

(12) United States Patent
Cao et al.

(10) Patent No.: US 11,991,751 B2
(45) Date of Patent: May 21, 2024

(54) IDENTIFICATION OF USER EQUIPMENT IN A RANDOM ACCESS PROCEDURE

(71) Applicant: QUALCOMM Incorporated, San Diego, CA (US)

(72) Inventors: Yiqing Cao, Beijing (CN); Jing Lei, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 17/310,485

(22) PCT Filed: Feb. 26, 2020

(86) PCT No.: PCT/CN2020/076712
§ 371 (c)(1),
(2) Date: Aug. 5, 2021

(87) PCT Pub. No.: WO2020/177586
PCT Pub. Date: Sep. 10, 2020

(65) Prior Publication Data
US 2022/0124813 A1 Apr. 21, 2022

(30) Foreign Application Priority Data
Mar. 5, 2019 (WO) ................ PCT/CN2019/076950

(51) Int. Cl.
*H04L 12/50* (2006.01)
*H04L 5/00* (2006.01)
*H04W 74/0833* (2024.01)

(52) U.S. Cl.
CPC ....... *H04W 74/0833* (2013.01); *H04L 5/0044* (2013.01); *H04L 5/0048* (2013.01)

(58) Field of Classification Search
CPC . H04W 74/0833; H04L 5/0044; H04L 5/0048
(Continued)

(56) References Cited

U.S. PATENT DOCUMENTS 11,805,555 B2 * 10/2023 Agiwal ................ H04L 5/0044
2015/0282215 A1 10/2015 Eriksson et al.
2018/0110074 A1 4/2018 Akkarakaran et al.

FOREIGN PATENT DOCUMENTS

CN 103703812 B 7/2017
WO 2013004002 A1 1/2013
(Continued)

OTHER PUBLICATIONS

Nokia, et al., "On 2-Step Random Access Procedure", 3GPP TSG RAN WG1 Ad-Hoc Meeting 1901, R1-1901192 On 2-step Random Access Procedure, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 11, 2019, Jan. 20, 2019, XP051594034, 7 Pages, page 1, line 34, paragraph 1 - line 35, p. 3, figure 2, p. 4, line 5 - line 7, p. 5, line 7 - line 11.
(Continued)

*Primary Examiner* — Dang T Ton
(74) *Attorney, Agent, or Firm* — ArentFox Schiff LLP

(57) ABSTRACT

A user equipment (UE) may be configured to generate a preamble of a first message associated with a random access channel (RACH) procedure, such as a two-step RACH procedure. The UE may be further configured to determine an identifier (ID) associated with the UE based on at least one of an ID associated with the preamble or a port index associated with a demodulation reference signal (DMRS). The UE may generate a payload of the first message that indicates the ID associated with the UE. The UE may then transmit the first message to a base station to initiate the RACH procedure. Potentially, the UE may receive a second message from the base station responsive to the first message, and the second message may confirm the ID associated with the UE.

56 Claims, 11 Drawing Sheets

(58) Field of Classification Search
USPC ................................ 370/329, 400, 401, 403
See application file for complete search history.

(56) References Cited

FOREIGN PATENT DOCUMENTS

| WO | 2018075256 A1 | 4/2018 |
| WO | 2018203674 A1 | 11/2018 |

OTHER PUBLICATIONS

Supplementary European Search Report—EP20765981—Search Authority—The Hague—Sep. 14, 2022-09-14.
International Search Report and Written Opinion—PCT/CN2020/076712—ISA/EPO—May 29, 2020.
International Search Report and Written Opinion.-11-22 (191715WO1).
Qualcomm Incorporated: "Procedures for Two-Step RACH", 3GPP Draft, R1-1903321, 3GPP TSG-RAN WG1 Meeting #96, Procedures for Two-Step RACH, 3rd Generation Partnership Project (3GPP), Mobile Competence Centre, 650, Route Des Lucioles, F-06921, Sophia-Antipolis, Cedex, France, vol. RAN WG1, No. Athens, Greece, Feb. 25, 2019-Mar. 1, 2019, Feb. 22, 2019 (Feb. 22, 2019), XP051600996, 9 pages, Retrieved from the Internet: URL:http://www.3gpp.org/ftp/tsg%5Fran/WG1%5FRL1/TSGR1%5F96/Docs/R1%2D1903321%2Ezip [retrieved on Feb. 22, 2019], p. 2-p. 41, Figure 1.
Samsung: "Channel Structure for Two-Step RACH" 3GPP TSG RAN WG1 #96, R1-1902241, Mar. 1, 2019 (Mar. 1, 2019) part 2, 5 pages.
ZTE: "Summary of 7.2.1.1 Channel Structure for Two-Step RACH", 3GPP TSG RAN WG1 #96, R1-1903435, Athens, Greece, Feb. 25-Mar. 1, 2019, Mar. 1, 2019 (Jan. 3, 2019), 28 Pages, the whole document.
Taiwan Search Report—TW109106191—TIPO—Nov. 19, 2023.

* cited by examiner

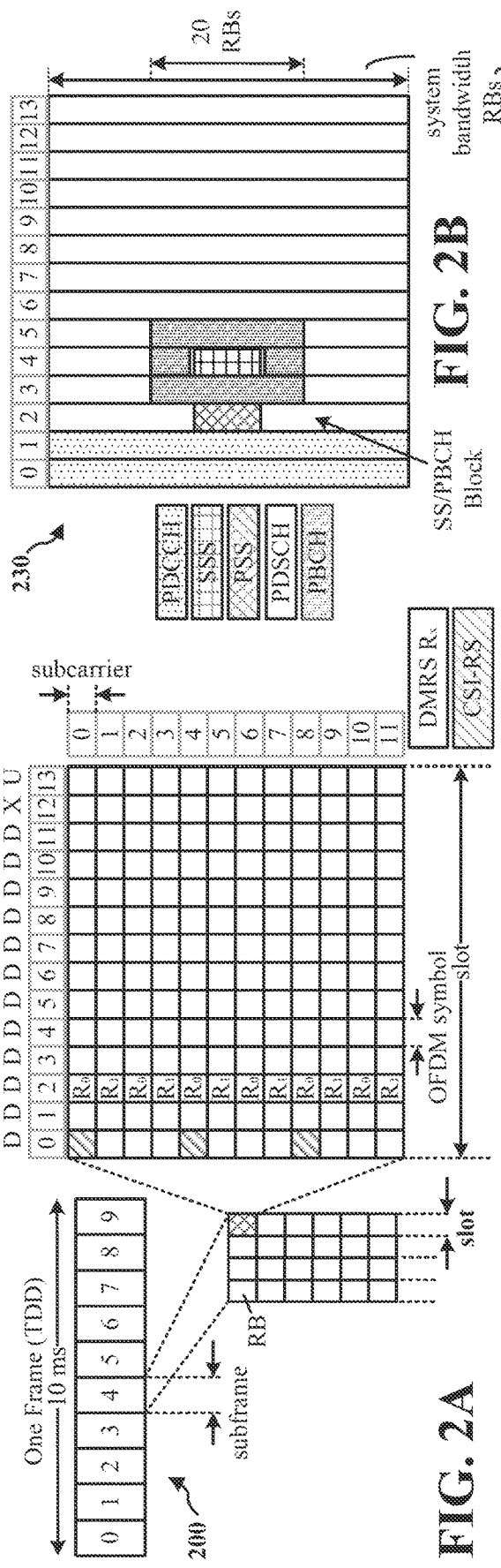
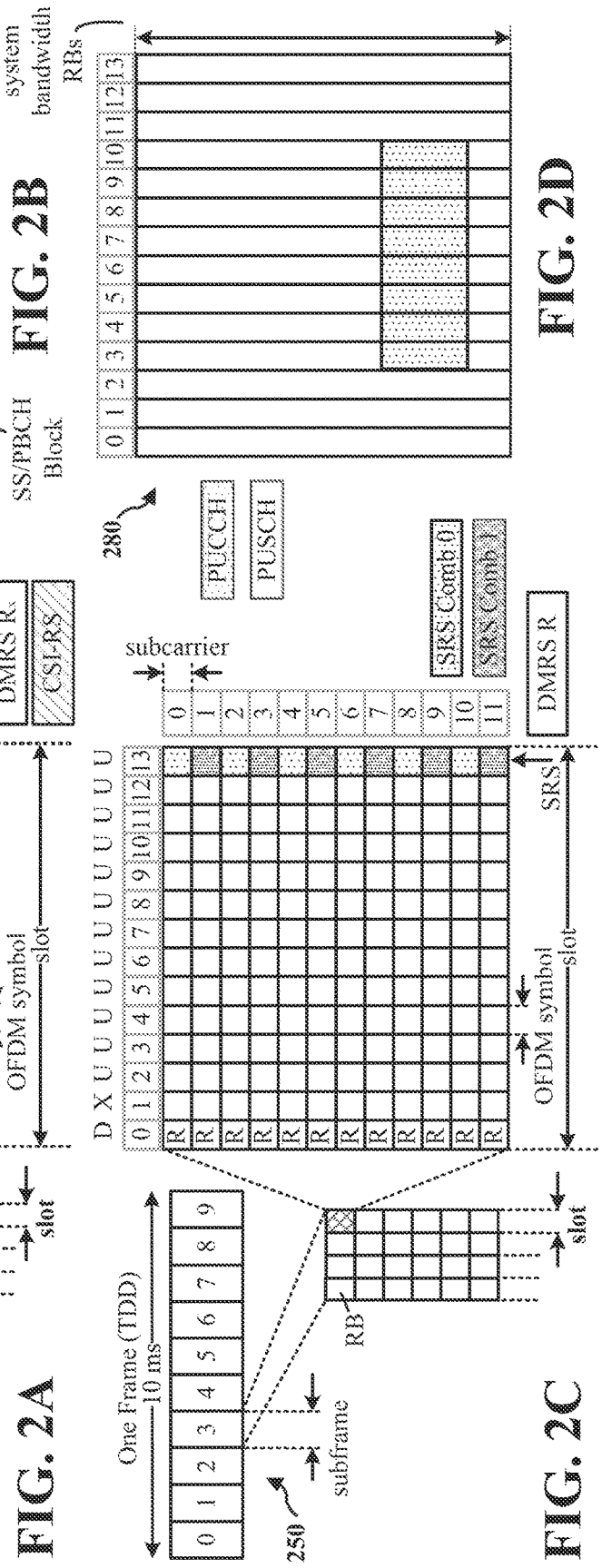
FIG. 2A FIG. 2B FIG. 2C FIG. 2D

IDENTIFICATION OF USER EQUIPMENT IN A RANDOM ACCESS PROCEDURE

CROSS REFERENCE TO RELATED APPLICATION(S)

This application is a national stage entry of PCT Application No. PCT/CN2020/076712, entitled "IDENTIFICATION OF USER EQUIPMENT IN A RANDOM ACCESS PROCEDURE" and filed on Feb. 26, 2020, which claims priority to International PCT Application No. PCT/CN2019/076950, entitled "IDENTIFICATION OF USER EQUIPMENT IN A RANDOM ACCESS PROCEDURE" and filed on Mar. 5, 20219, both of which are expressly incorporated by reference herein in their entirety.

BACKGROUND

Technical Field

The present disclosure relates generally to communication systems, and more particularly, to random access procedures in wireless communications networks.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various radio access technologies (RATs), a random access or random access channel (RACH) procedure may be performed in order for a user equipment (UE) to acquire uplink timing synchronization with as base station. Different conditions may cause the UE to perform a RACH procedure with a base station. For example, a UE may perform a RACH procedure during initial access to a cell provided by a base station, handover to the cell, reacquisition of uplink timing synchronization, etc.

A RACH procedure may include the exchange of messages between a UE and a base station. For example, one type of RACH procedure may include the exchange of four messages between the UE and the base station, and may be referred to as a "four-step RACH procedure." Another type of RACH procedure may include the exchange of two messages between the UE and the base station, and may be referred to as a "two-step RACH procedure."

In certain situations, a two-step RACH procedure may provide some benefits over a four-step RACH procedure. For example, a two-step RACH procedure may reduce signaling overhead, latency, and/or power consumption relative to a four-step RACH procedure. However, a two-step RACH procedure may offer fewer opportunities to exchange information relative to the four-step RACH procedure due to the fewer number of messages exchanged. Further, identifying specific UEs may prove challenging for a base station when multiple UEs are concurrently performing respective two-step RACH procedures.

In view of the foregoing, wireless communication systems including a base station and one or more UEs may benefit from mechanisms for conveying information identifying a specific UE during a two-step RACH procedure. The present disclosure may describe such mechanisms. For example, the present disclosure may describe a mechanism for indicating information identifying a UE in a first message sent by a UE to a base station in a two-step RACH procedure and, further, for acknowledging the information identifying the UE in a second message sent by the base station to the UE in the two-step RACH procedure. In so doing, the base station may support multiple concurrent first messages sent by multiple UEs preforming respective two-step RACH procedures in the same RACH occasion. In addition, a specific UE may be able to perform a two-step RACH procedure with the base station when in one of multiple Radio Resource Control (RRC) modes, such as an RRC Inactive mode, an RRC Idle mode, and/or ag RRC Connected mode.

In a first aspect of the disclosure, a first method, a first computer-readable medium, and a first apparatus are provided. The first apparatus may generate a preamble of a first message associated with a RACH procedure. The first apparatus may determine an identifier (ID) associated with the first apparatus based on at least one of an ID associated with the preamble or a port index associated with a demodulation reference signal (DMRS). The first apparatus may further generate a payload of the first message that indicates the ID associated with the UE. The first apparatus may then transmit the first message to a base station to initiate the RACH procedure.

In a second aspect of the disclosure, a second method, a second computer-readable medium, and a second apparatus an provided. The second apparatus may receive a first message including a preamble from a UE for initiation of a RACH procedure. The second apparatus may determine an ID associated with the UE based on the first message, the ID associated with the UE being based on at least one of an ID associated with the preamble or a port index of a DMRS associated with the first message. The second apparatus may then transmit, to the UE based on the first message, a second message indicating the ID associated with the UE for the RACH procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
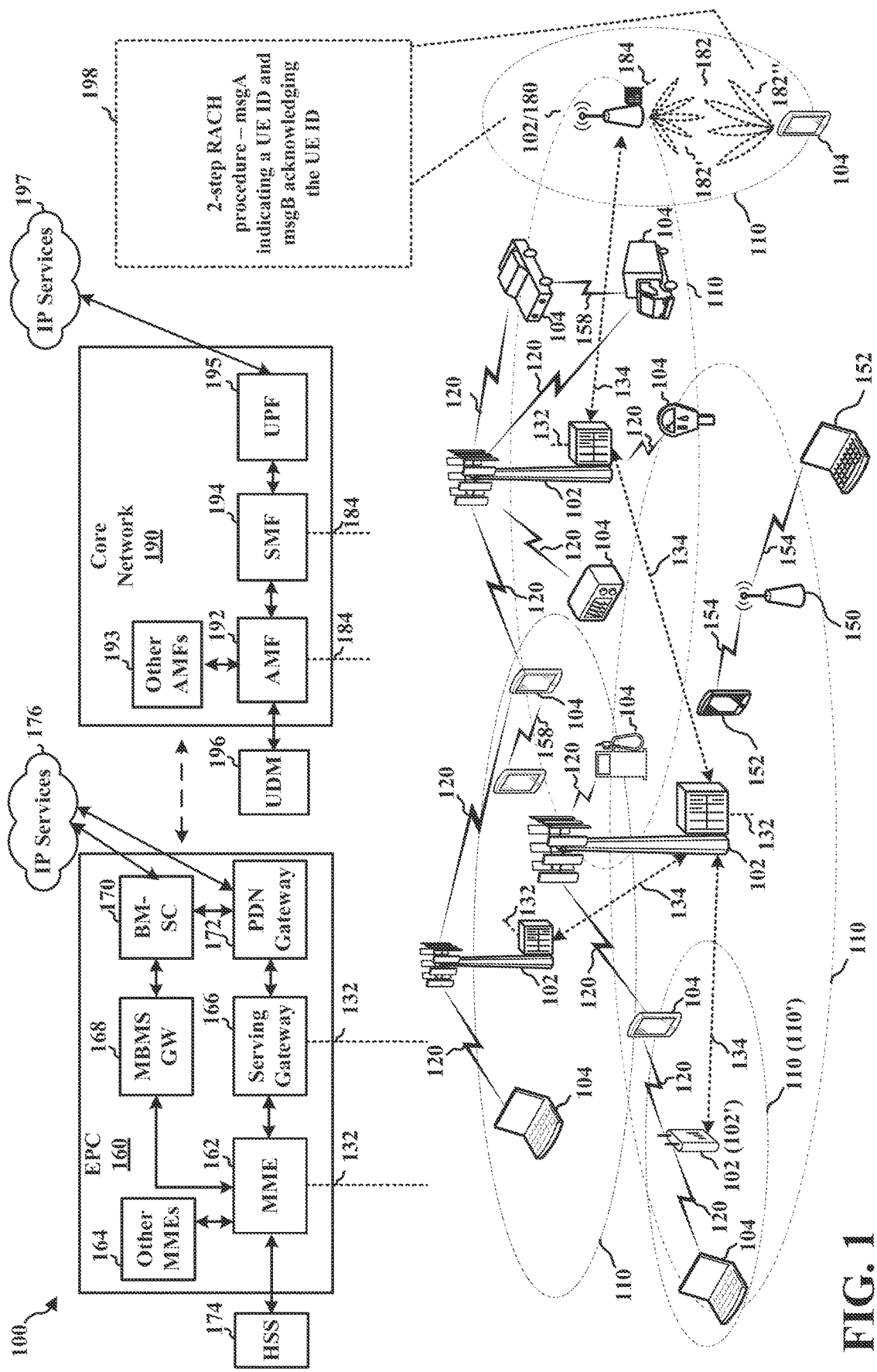
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, inactions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 107 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), patting, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSDCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAa) 152 via communication links 154 in a 5 GHz, unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR wind use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180 UE 104 may perform beam training to determine the best receive and transmit directions for each of the base station 180/UE 104. The transmit and receive directions for the base station 180 may or may not be the same. The transmit and receive directions for the UE 104 way or may not be the same.

The EPC 160 may include a Mobility Management Entity (MME) 162, other MMEs 164, as Serving Gateway 166, at Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The IP Gateway 172 and the BM-SC 170 are connected to the IP Services 176. The IP Services 176 may include the Internet, an intranet, an IP Multimedia Subsystem (IMS), a PS Streaming Service, and/or other IP services. The. BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone a laptop, a personal digital assistant (PDA), a satellite radio, global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, a UE 104 and a base station 102/180 may perform a two-step random access channel (RACH) procedure (198). The two-step RACH procedure (198) may include the exchange of two messages between the UE 104 and the base station 102/180. Specifically, the UE 104 may initiate the two-step RACH procedure (198) by transmitting a first message to the base station 102/180. The first message may be referred to as a "msgA," and may include at least a preamble and a payload.

The UE 104 may indicate the identity of the UE 104 in the first message through at least one configuration, although the UE 104 may indicate the identity of the UE 104 through more than one configuration. According to one configuration, the UE 104 may indicate the identity of the UE 104 based on a radio network temporary identifier (RNTI) that is modified from another RNTI, such as modified from a random access (RA) RNTI (RA-RNTI). For example, the UE 104 may determine a modified RNTI to indicate the identity of the UE 104 based on at least one of an identifier (ID) (e.g., ID and/or index) associated with the preamble and/or a demodulation reference signal (DMRS) port index selected by the UE 104. In one configuration, the DMRS port index, selected by the UE 104 may correspond with another DMRS port index at the base station 102/180—e.g., a UE-specific uplink DMRS port index may at least partially identify the UE 104, and the base station 102/180 may consider a one-to-one mapping between a downlink DMRS port index and the uplink DMRS port index.

According to another configuration, the UE 104 may indicate the identity of the UE 104 by indicating the identity of the UE 104 in the payload of the first message. For example, the UE 104 may explicitly indicate the identity of the UE 104 by including a unique ID of the UE 104 in the payload of the first message. The UE 104 may determine the unique ID of the UE 104 to include in the payload based on a Radio Resource Control (RRC) mode in which the UE 104 is operating. Further, the UE 104 may indicate an RRC connection request through the inclusion of the unique ID of the UE 104 in the payload of the first message.

In the two-step RACH procedure (198), the base station 102/180 may receive the first message transmitted by the UE 104. The base station 102/180 may determine the identity of the UE 104 according to at least one of the configurations implemented by the UE 104 for indicating the identity of the UE 104. For example, the base station 102/180 may determine the identity of the UE 104 based on the modified RNTI and/or based on the unique ID of the UE 104 indicated in the payload of the first message.

To complete the two-step RACH procedure (198), the base station 102/180 may transmit a second message to the UE 104. The second message may be known as a "msgB," and the base station 102/180 may use the second message to acknowledge the identity of the UE 104. According to one configuration the base station 102/180 may scramble a cyclic redundancy check (CRC), included in downlink control information (DCI) of the second message, using the modified RNTI. In so doing, the base station 102/180 may acknowledge, to the UE 104, that the base station 102/180 has successfully detected at least the preamble of the first message. In another configuration, the base station 102/180 may associate the index and/or ID of the preamble of the first message with a set of resources allocated for the second message. Accordingly, the base station 102/180 may transmit the second message an the allocated set of resources in order to indicate successful detection of the modified RNTI by the base station 102/180.

In still another configuration, the base station 102/180 may include the unique ID of the UE 104 in the second message. In so doing, the base station 102/180 may acknowledge the successful detection of the payload of the first message. According to one aspect, the base station 102/180 may transmit the second message to the UE 104 for contention resolution, e.g., as indicated by the inclusion of the unique ID of the UE 104 in the second message.

Other configurations may be described herein, e.g., with respect to FIGS. 5-11. According to the concepts described in the present disclosure, a UE may indicate and a base station may acquire an identity of the UE through to two-step RACH procedure. By indicating an identity of as UE through a two-step RACH procedure, as described in the present disclosure, signaling overhead, latency, and/or power consumption may be reduced, e.g., relative to as four-step RACH procedure. Moreover, spectral efficiency may be improved in some configurations e.g., relative to a four-step RACH procedure.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols an UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios limited to a single stream transmission). The number of slots within a subframe is based on the slot configuration and the numerology. For slot configuration 0, different numerologics µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology with 4 slots per subframe. The slot duration is 0.25 ms, the subcarrier spacing is 60 kHz, and the symbol duration is approximately A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include a DMRS (indicated as $R_x$ for one particular configuration, where $100x$ is the port number, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CUE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS. The physical broadcast channel (PBCH), which carries as master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
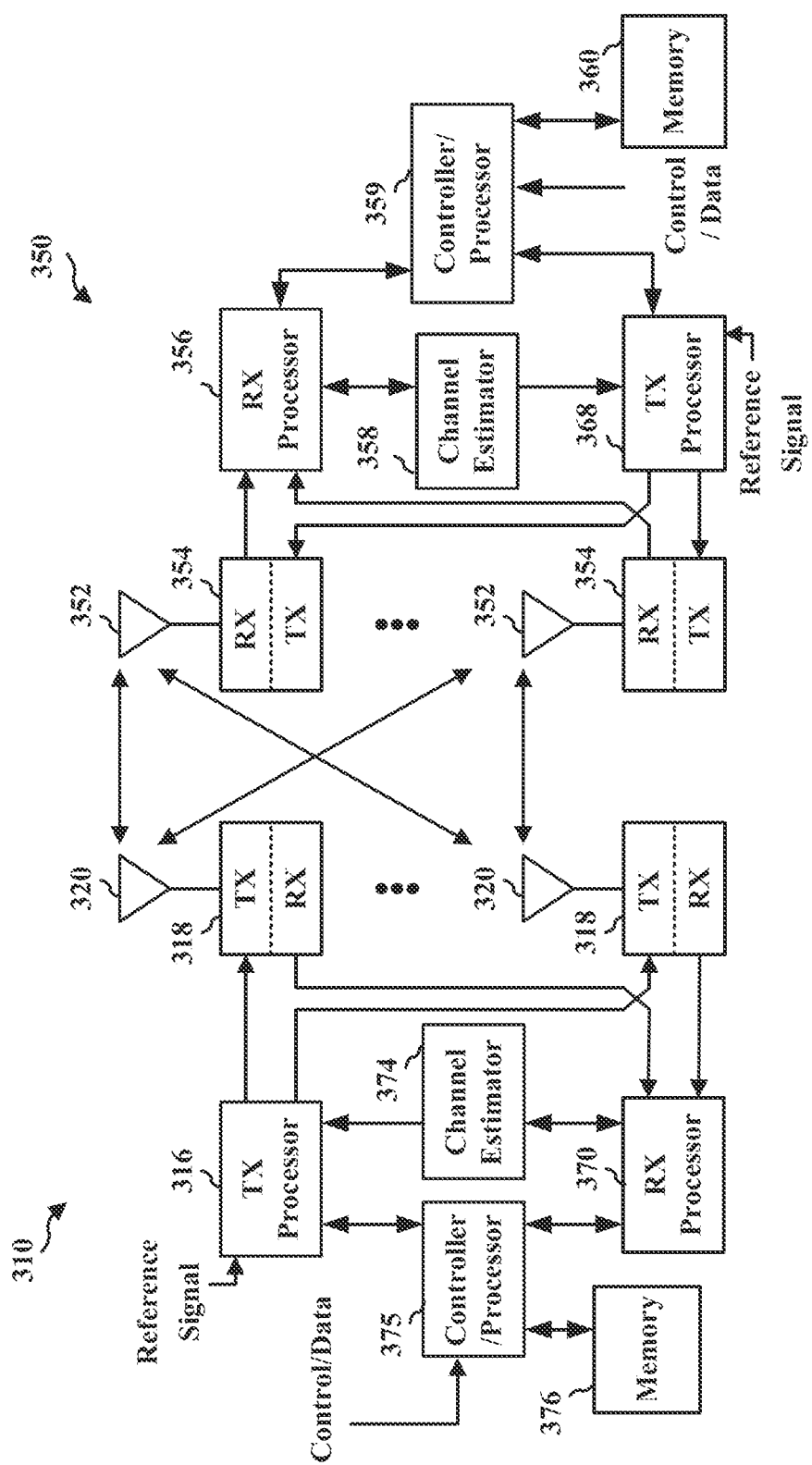
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller processor 359, which implements layer 3 and layer 2 functionality.

The controller/processor 359 can be associated with a memory 360 that stores program codes and data. The memory 310 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by as channel estimator 358 from as reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with (198) of FIG. 1.

In some other aspects, at least one of the TX processor 316, the RX processor 370, and the controller/processor 375 may be configured to perform aspects in connection with (198) of FIG. 1.

According to various RATs, a random access or RACH procedure may be performed in order for a UE to acquire uplink timing synchronization with a base station. Different conditions may cause the UE to perform a RACH procedure with a base station. For example, a UE may perform a RACH procedure during initial access to as cell provided by a base station handover to the cell, reacquisition of uplink timing a synchronization, etc.

A RACH procedure may include the exchange of messages between a UE and a base station. For example, one type of RACH procedure may include the exchange of four messages between the UE and the base station, and may be referred to as a "four-step RACH procedure." Another type of RACH procedure may include the exchange of two messages between the UE and the base station, and may be referred to as a "two-step RACH procedure."

In certain situations, a two-step RACH procedure may provide some benefits over a four-step RACH procedure. For example, a two-step RACH procedure may reduce signaling overhead, latency, and/or power consumption relative to a four-step RACH procedure. However, a two-step RACH procedure may offer fewer opportunities to exchange information relative to the four-step RACH procedure due to the fewer number of messages exchanged. Further, identifying specific UEs may prove challenging for a base station when multiple UEs are concurrently performing respective two-step RACH procedures.

In view of the foregoing, wireless communication systems including a base station and one or more UEs may benefit from mechanisms for conveying information identifying a specific UE during a two-step RACH procedure. FIGS. 5-11 describe various techniques and solutions for indicating information identifying a UE in a first message sent by a UE to a base station in a two-step RACH procedure and, further, for acknowledging the information identifying the UE in a second message sent by the base station to the UE in the two-step RACH procedure. In so doing, the base station may support multiple concurrent first messages sent by multiple UEs performing respective two-step RACH procedures in the same RACH occasion. In addition, as specific UE may be able to perform a two-step RACH procedure with the base station when in one of multiple RRC modes, such as an RRC Inactive mode, an RRC Idle mode, and/or an RRC Connected mode.

Figure 4:
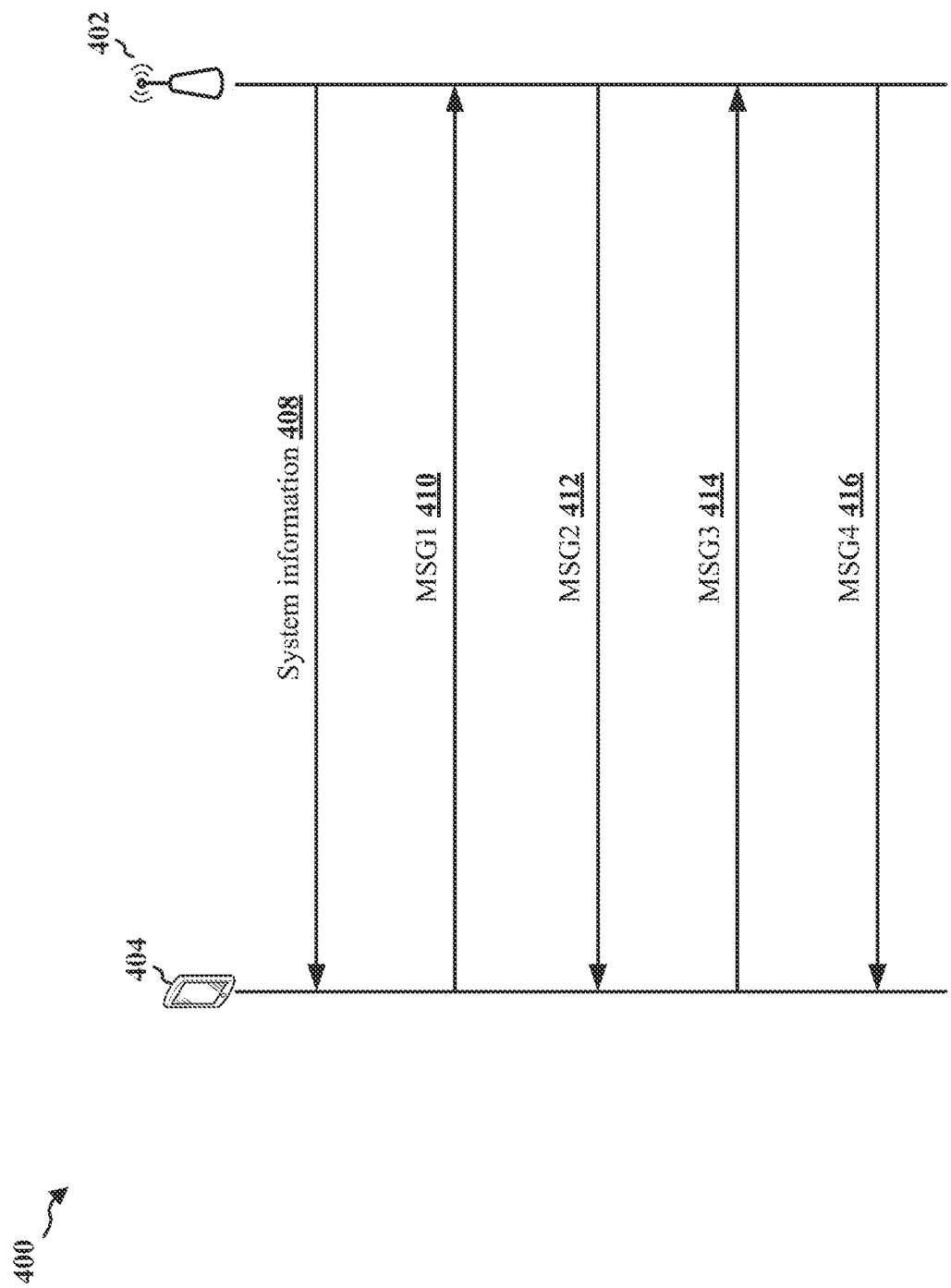
FIG. 4 is a call flow diagram illustrating an example of a four-step random access channel (RACH) procedure.

FIG. 4 illustrates a call flow diagram of a four-step RACH procedure in a wireless communications system 400. A base station 402 may be configured to provide a cell. For example, in the context of FIG. 1, the base station 402 may be implemented as the base station 102/180 and, accordingly, the cell may include a geographic coverage area 110 in which communication coverage is provided and/or a small cell 102' having a coverage area 110'. Further, the UE 404 may be implemented as the UE 104. In another example, in the context of FIG. 3, the base station 402 may be implemented as the base station 310 and the UE 404 may be implemented as the UE 350.

The UE 404 may perform the four-step RACH procedure in order to acquire uplink synchronization and/or acquire an uplink grant for a network. In one configuration, the UE 404 may acquire downlink synchronization prior to acquiring uplink synchronization, e.g., by acquiring at least one SS/PBCH block (as described with respect to FIG. 23, supra).

The base station 402 may send (e.g., broadcast) one or more SIBs 408, which may indicate configuration information for performing the four-step RACH procedure. For example, the base station 402 may include information indicating at least a PRACH configuration, an available set of random access preambles, a random access response (RAR) window, an initial preamble transmission power, a power ramping factor, a maximum number of preamble transmissions, a contention resolution timer, and/or other information associated with a four-step RACH procedure.

The UE 404 may receive the one or more SIBs 408, and decode the one or more SIBs 408 to acquire the RACH configuration information. The UE 404 may determine an RA-RNTI which may correspond to a set of resources for preamble transmission of the RACH procedure. Based on the RACH configuration information, the UE 404 may determine (e.g., generate, select, etc.) a RACH preamble, which may correspond with the RA-RNTI and a random access preamble index. The UE 404 may include the RACH preamble in the MSG1 410, and the UE 404 may send the MSG1 410 to the base station 402 on a set of resources based on the RACH configuration information. The RA-RNTI may be indicated through the MSG1 410—e.g., the set of resources on which the preamble of the MSG1 410 is transmitted may indicate the RA-RNTI.

The base station 402 may receive the MSG1 410 and, based on the MSG1 410, the base station 402 may generate a MSG2 412 comprising an RAR. For the MSG2 412, the base station 402 may generate and send DCI on a PDCCH masked with the RA-RNTI. The DCI may include data on a PDSCH, and the DCI may indicate the set of resources on which the UE 404 may detect the PDSCH. The base station 402 may generate the MSG2 412 to indicate a temporary cell RNTI (T-CRNTI) associated with the UE 404. Further, the base station 402 may generate the MSG2 412 to indicate a random access preamble identifier (RAPID), which may correspond with the random access preamble index used by the UE 404 for the MSG1 412. In addition, the base station 402 may determine a timing advance and/or an uplink grant (e.g., an uplink grant for when the UE 404 has data to send to the base station 402), and the base station 402 may generate the MSG2 412 to include information indicating the timing advance and/or uplink grant. The base station 402 may send the MSG2 412 to the UE 404, e.g., in a set of resources associated with the RA-RNTI included in the MSG1 410.

The 404 may monitor for the MSG2 412 in an RAR window, as indicated by the one or more SIBs 408. The UE 404 may receive the MSG2 412 in the RAR window, and may apply the timing advance indicated therein to acquire uplink timing synchronization. The UE 404 may generate a MSG3 414 based on the MSG2 412 (e.g., the MSG3 414 may also be referred to as an RRC connection request message and/or a scheduled transmission message). The MSG3 414 may establish a device identity for the UE 404 and, therefore, may the UE 404 may generate the MSG3 414 to indicate a cell RNTI (C-RNTI) and/or a core-network device ID associated with the UE 404. In the context of FIG. 1, for example, a core-network device ID may identify the UE 404 in the EPC 160 and/or core network 190). In a further configuration, the UE 404 may indicate a connection establishment clause in the MSG3 414. In still another configuration, the UE 404 may include information of the MSG3 414 (e.g., uplink data buffered by the UE 404) on a PUSCH, which may be assigned to the UE 404 by the uplink grant included in the MSG2 412. The UE 404 may send the MSG3 414 to the base station 402.

Responsive to the MSG3 414, the base station 402 may generate a MSG4 416. The base station 402 may generate the MSG4 416 to establish contention resolution and/or connection setup. The base station 402 may address the MSG4 416 toward the device identity indicated by the MSG3 414, such as the C-RNTI and/or core-network device ID. The base station 402 may send the MSG4 416 to the UE 404, which may complete the four-step RACH procedure when received by the UE 404.

As described, supra, the UE 404 may send a relatively small amount of data to the base station 402 during the four-step RACH procedure. For example, the UE 404 may send, to the base station 402, data buffered by the UE 404 at the time of the four-step RACH procedure on the PUSCH of the MSG3 414. The UE 404 may send such uplink data on the PUSCH of the MSG3 414 according to uplink grant and after acquiring uplink timing synchronization, as allocated by the base station 402 in the MSG2 412. However, without acquisition of a valid timing advance and application thereof for uplink timing synchronization, the four-step RACH procedure may not support such uplink data transmission by the UE 404 (e.g., transmission of a relatively small amount of data buffered by the UE 404 when performing the four-step RACH procedure).

As an alternative to a four-step RACH procedure (e.g., the four-step RACH procedure), a UE may perform a two-step RACH procedure. Such a two-step RACH procedure may include the exchange of two messages between the UE and a base station. Illustratively, the two-step RACH procedure may include a first message (e.g., msgA) that may combine various aspects of a MSG1 (e.g., the MSG1 410) and a MSG3 (e.g., the MSG3 414), and may further include a second message (e.g., msgB) that may combine various aspects of a MSG2 (e.g., the MSG2 412) and a MSG4 (e.g., the MSG4 416).

In a two-step RACH procedure, a UE may be able to send a relatively small amount of data in the first message, such as data buffered by the UE at the time of the two-step RACH procedure. For example, the UE may include a relatively small amount of data on a PUSCH of the first message. According to various configurations, a UE may include such a relatively small amount of data in a first message of a two-step RACH procedure when operating in one of multiple RRC modes, it an RRC Inactive mode, an RRC Idle mode, and an RRC Connected mode.

In performing a two-step RACH procedure instead of a four-step RACH procedure, signaling overhead, latency, and/or power consumption may be reduced. Moreover, spectral efficiency may be improved when performing a two-step RACH procedure instead of a four-step RACH procedure when a UE is operating in an RRC Connected mode.

However, concurrent transmissions of multiple first messages by multiple UEs during the same RACH occasion in a cell may collide when received by a base station providing the cell. Further, each of the multiple UEs may be operating in a respective RRC mode that may be different from another RRC mode in which another UE is operating.

As described in FIGS. 5-11, a respective identity of each UE may be indicated by a respective first message in order to support multiple UEs utilizing the same RACH occasion for two-step RACH procedures. Further to the support of multiple UEs utilizing the same RACH occasion for two-step RACH procedures, the base station may acknowledge a respective identity of each UE in a respective second message sent to each UE, as further described in FIGS. 5-11.

Figure 5:
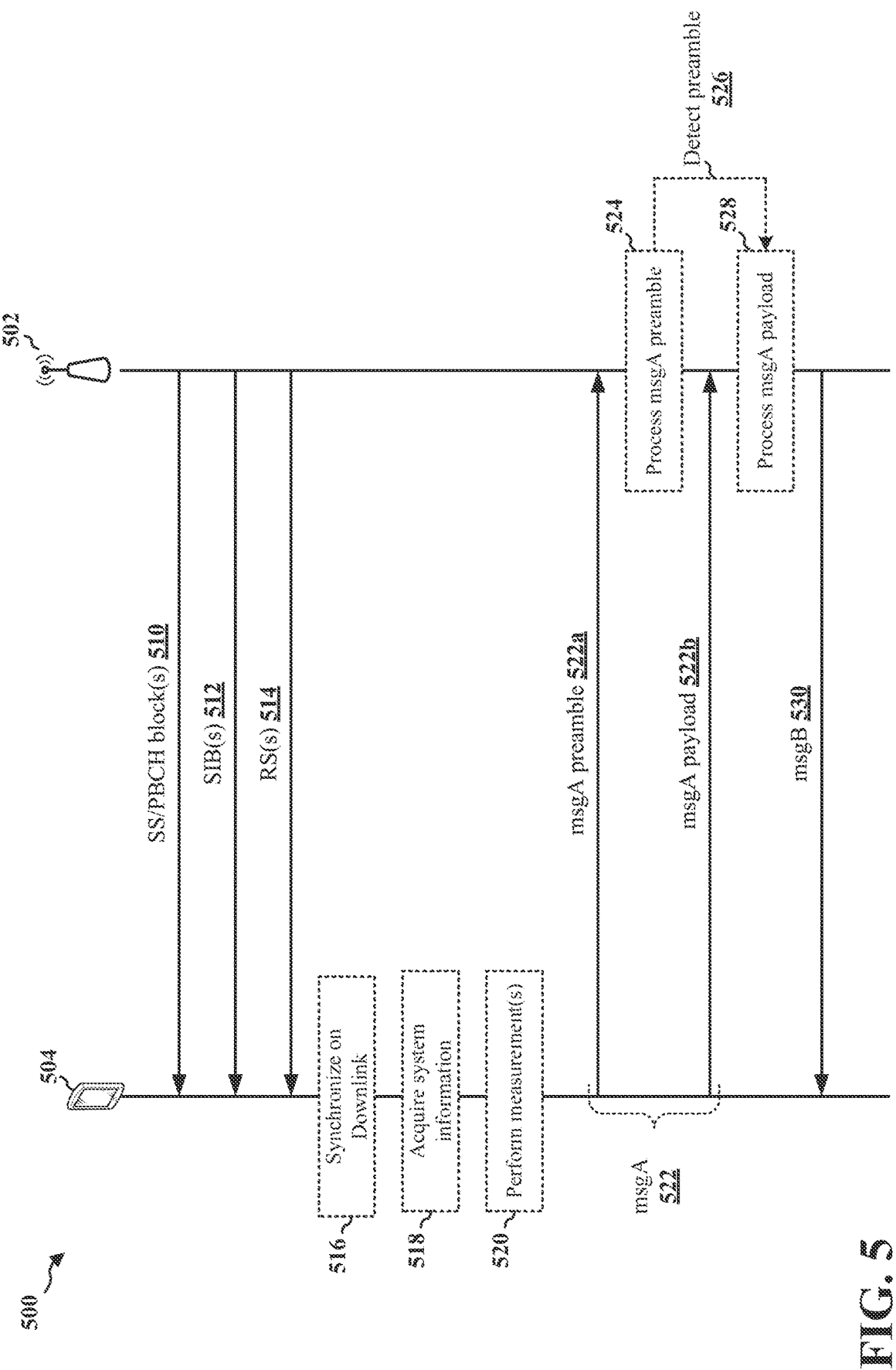
FIG. 5 is a call flow diagram illustrating an example of a two-step RACH procedure.

Referring to FIG. 5, a call flow diagram illustrates a two-step RACH procedure in a wireless communications system 500, according to various aspects of the present disclosure. A base station 502 may be configured to provide a cell. For example, in the context of FIG. 1, the base station 502 may be implemented as the base station 102/180 and, accordingly, the cell may include a geographic coverage area 110 in which communication coverage is provided and/or a small cell 102' having a coverage area 110'. Further, a UE 504 may be implemented as the UE 104.

In another example, in the context of FIG. 3, the base station 502 may be implemented as the base station 310 and the UE 504 may be implemented as the UE 350.

The UR 504 may perform the two-step RACH procedure in order to acquire uplink synchronization and/or acquire an uplink grant for a network. In various configurations, the UE 504 may indicate an identity or ID of the UE 504 through the two-step RACH procedure and further, the base station 502 may acknowledge the ID of the UE 504 through the two-step RACH procedure.

For the cell, the base station 502 may transmit (e.g., broadcast) a set of SS/PBCH blocks 510. For example, the base station 502 may transmit a respective one of the SS/PBCH blocks 510 on a respective one of a set of beams of the base station 502 (e.g., an SS/PBCH block may be described with respect to FIG. 2B, supra). The UE 504 may detect one or more of the SS/PBCH blocks 510, and the UE 504 may acquire downlink synchronization 516 based on at least one of the SS/PBCH blocks 510.

To provide system information in the cell, the base station 502 may transmit (e.g., broadcast) a set of SIBs 512. The base station 502 may include, in at least one of the SIBs 512, information associated with a two-step RACH procedure in the cell, for example, including a PRACH configuration, an available set of random access preambles, an RAR window, an initial preamble transmission power, a power ramping factor, a maximum number of preamble transmissions, a contention resolution timer, and/or other information associated with a two-step RACH procedure in the cell.

The UE 504 may receive the set of SIBs 512, and may decode each of the set of SIBs 512. The UE 504 may acquire system information 518 from the decoded set of SIBs 512, including the information associated with the two-step RACH procedure in the cell.

Further, the base station 502 may transmit (e.g., broadcast) a set of RSs 514. The UE 504 may receive one or more of the set of RSs 514. The UE 504 may perform measurements 520 on the received set of RSs 514 and/or the received set of SS/PBCH blocks 510. The UE 504 may be configured with a candidate beam list based on the performed measurements 520.

In some aspects the UE 504 may determine configuration information associated with a two-step RACH procedure based on the performed measurements 520. For example, the UE 504 may determine a preamble index and/or a PRACH occasion based on the performed measurements 520—e.g., the UE 504 may determine a preamble index and/or a PRACH occasion corresponding to one of the set of RSs 514 and/or corresponding to one of the set of SS/PBCH blocks 510.

In the wireless communications system 500, a two-step RACH procedure may include the exchange of two messages between the UE 504 and the base station 502. The UE 504 may initiate the two-step RACH procedure with a first message, which may be referred to as a msgA 522. The msgA 522 may include a preamble 521a and a payload 522b. The base station 502 may complete the two-step RACH procedure with a second message, which may be referred to as a msgB 530. An identity of the UE 504 may be conveyed and acknowledged through the exchange of the msgA 522 and msgB 530.

For the msgA 522, the UE 504 may determine a preamble 522a. The UE 504 may determine the preamble 522a based on configuration information indicated in the set of SIBs 512. For example, the UE 504 may determine (e.g., generate, select, etc.) the preamble 522a based on an ID or index corresponding to the preamble 522a. According to one configuration, the UE 504 may determine a preamble 522a that corresponds to an RA-RNTI and a random access preamble index. An RA-RNTI may be defined based on an index of a first OFDM symbol of a PRACH occasion (s_id) (0≤s_id<14), an index of a first slot of the PRACH occasion in a system frame (t_id) (0≤t_id<80), an index of the PRACH occasion in a frequency domain (f_id) (0≤f_id<8), and an uplink carrier used for random access preamble transmission (uplink_carrier_id). For example:

$$RA\text{-}RNTI = 1 + s\_id + 14 \times t\_id + 14 \times 80 \times f\_id + 14 \times 80 \times 8 \times uplink\_carrier\_id$$

In order to indicate an identity of the UE 504, a modified RNTI may be used for UE-specific scrambling (e.g., PUSCH processing of the msgA 522). That is, the modified RNTI may identify the UE 504 and, according to various configurations, different modified RNTIs may identify different UEs in the cell.

In some configurations, the UE 504 may use a modified RNTI to supplement the RA-RNTI. However, unlike the RA-RNTI, the modified RNTI may be defined based on an ID of the preamble 522a (preamble_id) (0≤preamble_id<preamble#). Further, the modified RNTI may be defined based on a first constant (k)(e.g., k=14×80× 8×2). For example:

$$Modified\_RNTI = 1 + s\_id + 14 \times t\_id + 14 \times 80 \times f\_id + 14 \times 80 \times 8 \times uplink\_carrier\_id + k \times preamble\_id$$

In one configuration, the modified RNTI may be defined based on a shortened ID of the preamble 522a. For example a shortened preamble ID may be mapped to the ID of the preamble 522a. Thus, according to one configuration, the shortened ID of the preamble 522a may be based on a set of the most significant bits (e.g., the two most significant bits) or a set of the least significant bits (e.g., the two least significant bits), which may allow different UEs to be identified based on respective modified RNTIs while also reducing the implementation complexity and/or signaling overhead. The base station 502 may be able to resolve ambiguities arising from conflicts due to shortened preamble IDs used by different UEs. According to one example, a shortened preamble ID may be derived by a hash function of the ID of the preamble 522a. For example, the last two digits of the ID of the preamble 522a may be equal to the shortened preamble ID (preamble_short_id):

$$Modified\_RNTI = 1 + s\_id + 14 + t\_id + 14 \times 80 \times f\_id + 14 \times 80 \times 8 \times uplink\_carrier\_id + k \times preamble\_short\_id$$

According to some configurations, the modified RNTI may be based on a DMRS port index. For example, the UE 504 may use a DMRS port index to convey the identity of the UE 504. In one such configuration, the UE 504 may use a combination of the index or ID of the preamble 522a and the DMRS port index (e.g., UE-specific uplink DMRS port index) to identify the UE 504, which may be used for both the msgA 522 (PUSCH scrambling) and msgB 530 (PDCCH scrambling). Further, the combination of the index or ID of the preamble 572a and the DMR port index (e.g., UE-specific uplink DMRS port index) may be used by the base station 502 to identify the UE 504 during DMRS/PUSCH processing (e.g., payload processing 528).

The UE 504 may select a DMRS sequence and, therefore, different UEs may select different DMRS sequences. In various examples, the UE 504 may select a DRMS sequence by generating a shifting vector with the ID of the UE 504, and the UE 504 may implement the shifting vector to a cell-specific root sequence. For example, the modified RNTI may be based on an equation that consider the DMRS port index (DMRS_id) (0≤DMRS_id<DMRS#) and a second constant (n) (e.g., n=14×80×8×2>preamble size).

$$Modified\_RNTI = 1 + s\_id + 14 \times t\_id + 14 \times 80 \times f\_id + 14 \times 80 \times 8 \times uplink\_carrier\_id + k \times preamble\_id + n \times DMRS\_id$$

Similar to the shortened preamble ID, the modified RNTI may be shortened in length using a hash of at least the DMRS_id and, potentially preamble_id may be derived by a hash function of the ID of the preamble 522a.

In addition to the preamble 522a, the msgA 522 may include a payload 522b, the payload 522b may allow the UE 504 to convey a relatively small amount of data to the base station 502. The payload 522b may be at least partially on a PUSCH. Referring to FIG. 4, the payload 522b may be relatively smaller than the payload of the MSG3 414.

According to one configuration, the UE 504 may convey the identity of the UE 504 through the payload 522b. The identity of the UE 504 in the payload 522b may function as an RRC connection request. Indicating the identity of the UE 504 through the payload 522b may differ from the RA-RNTI and/or modified RNTI, which are defined with respect to a PRACH occasion, resource index, and/or preamble_id/DMRS_id. Moreover, the identity of the UE 504 indicated in the payload 522b may be unique to the UE 504.

The UE 504 may explicitly indicate the identity of the UE 504 in the payload 522b. For example, the UE 504 may indicate the identity by including a unique ID of the UE 504 in the payload 522b—e.g., the unique ID of the UE 504 may be carried on the PUSCH of the payload 522b.

In one configuration, the UE 504 may determine at least one value for indicating the unique ID of the UE 504 based on an assignment through a RAN—the UE 504 may be assigned at least one value by another base station that previously served the UE 504 or the UE 504 may be assigned a unique ID by the base station 502 prior to a radio link failure that causes the UE 504 to perform the two-step RACH procedure. In another example, the UE 504 may determine the unique ID of the UE 504 based on an assignment through a core network entity, such as an MME or other core network entity (e.g., in the context of FIG. 1, an entity of the EPC 160, such as the MME 162, and/or an entity of the core network 190).

Thus, according to various configurations, the UE 504 may determine the unique ID of the UE 504 based on an RRC mode in which the UE 504 is operating when initiating the two-step RACH procedure. In one configuration, the UE 504 may indicate the identity through a cell RNTI (C-RNTI) when the UE 504 is operating in an RRC Connected mode or an RRC Inactive mode. In another configuration, the UE 504 may indicate the unique ID of the UE 504 through a temporary mobile subscriber identity (TMSI), an international mobile subscriber identity (IMSI), and/or a core-network UE identifier when the UE 504 is operating in an RRC Idle mode.

The UE 504 may transmit the msgA 522, including the preamble 522a and the payload 522b, to the base station 502 on a set of resources associated with the PRACH. In particular, the UE 504 may be configured to transmit the msgA in a RACH occasion. The UE 504 may determine the RACH occasion based on the configuration information indicated in the set of SIBs 512. In one aspect, the set of resources in which the UE 504 may transmit the msgA 522 may correspond with an RA-RNTI associated with the msgA 522 and/or a configuration of a modified RNTI functioning as a scrambling ID for the payload 522b of the msgA 522.

After the UE 504 transmits the msgA 522, the UE 504 may monitor for a response to the msgA 522. The response to the msgA 522 may be the msgB 530, which may comprise an RAR. Accordingly, the UE 504 may monitor for the msgB 530 in an RAR window. The RAR window may include a set of resources defined by the configuration information indicated in the set of SIBs 512. The RAR window may correspond to the RA-RNTI and/or modified RNTI.

In order to provide the msgB 530 to the UE 504, the base station 502 may detect for the msgA 522. In various configurations, the base station 502 may receive the msgA 522, and may process 524 the preamble 522a for preamble detection 526. If the preamble detection 526 is successful, the base station 502 may detect and process 528 the payload 522b of the msgA 522.

In some aspects, the preamble detection 526 and/or payload processing 528 may be unsuccessful. For example, if the base station 502 is unable to successfully per preamble detection 526 the base station 502 may be unable to successfully perform the payload processing 528. Unsuccessful preamble detection 526 and/or unsuccessful payload processing 528 may cause the to RACH procedure to fail and, therefore, the UE 504 may reattempt the two-step RACH procedure.

However, in order to trigger retransmission of the msgA 522, the UE 504 should be informed by the base station 502 that the preamble detection 526 and/or payload processing 528 were unsuccessful. Correspondingly, the UE 504 should be informed that the preamble detection 526 and/or payload processing 528 were successful so that the UE 504 does not retry the msgA 522. The base station 502 may be configured to indicate acknowledgement of the preamble 522a and/or payload 522b through the msgB 530, which may be responsive to the msgA 522 and may complete the two-step RACH procedure.

The base station 502 may generate the msgB 530 to include information on a PDCCH and a PDSCH. In one configuration, the msgB 530 may include DCI on the PDCCH, and the DCI may indicate a set of resources on which the PDSCH may be found.

The modified RNTI may be configured as a scrambling ID for the payload 522b of the msgA 522. In order to acknowledge successful preamble detection 526 to the UE 504, the base station 502 may scramble at least a portion of the msgB 530 with the modified RNTI. In one configuration, the base station 502 may scramble a CRC of DCI on the PDCCH of the msgB 530 using the modified RNTI. The base station 502 may scramble the CRC using the modified RNTI to indicate acknowledgement of successful preamble detection 526. The base station 502 may be configured to scramble the CRC of the msgB 530 using the modified RNTI even when payload processing 528 is unsuccessful, e.g., because scrambling of the CRC using the modified RNTI may acknowledge successful preamble detection 526 to the UE 504, but may not indicate successful payload processing 528.

In another configuration, the base station 502 may scramble a CRC of DCI on the PDCCH of the msgB 530 using the RA-RNTI associated with the preamble 522a. In a further configuration, the base station 502 may scramble a CRC of DCI on the PDCCH of the msgB 530 using a group-specific scrambling sequence—e.g., the base station 502 may apply scrambling to the CRC of DCI of the msgB 530 as a function of a group ID of preamble sequences.

In still another configuration, the base station 502 may associate an index of the preamble 522a with a time/frequency resource allocation scheme for the msgB 530. For example, the base station 502 may determine a resource allocation on which the msgB 530 is to be carried based on preamble_id=A=RB_index+B×Symbol_index, where A and B are constants, RB_index is a PRB index in the frequency domain, and Symbol_index is a symbol index in a subframe or frame. In one aspect of such a configuration, a slot number for such a resource allocation may be implicitly derived (e.g., in the next K slot, where K is a predefined constant), and/or preamble_id=A×RB_index+B×Symbol_index+C×slot_index (where C is a constant and the slot_index may be implicitly derived as the next predefined K slot). Like scrambling the CRC using the modified RNTI, such a resource allocation for the msgB 530 may acknowledge successful preamble detection 526.

As described, supra, the modified RNTI may be based on an uplink DMRS port index e.g., in order to identify the UE 504 in processing of the DMRS/PUSCH processing by the base station 502. The base station 502 may be configured to consider a one-to-one mapping between a downlink DMRS port index and an uplink DMRS port index, and the base station 502 may transmit the downlink DMRS port index to the UE 504 in the msgB 530 as an acknowledgement of the identity of the UE 504 during DMRS/PDCCH processing and/or DMRS/PDSCH processing of the msgB 530 by the UE 504. The one-to-one mapping between a downlink DMRS port index and an uplink DMRS port index (e.g. for acknowledgement of the identity of the UE 504) may reduce signaling overhead, e.g., relative to explicit signaling.

In various configurations, the base station 502 may include the unique ID associated with the UE 504 (e.g., C-RNTI, S-TMSI, IMSI, and/or core-network UE identifier included in the payload 522b of the msgA 522 to uniquely identify the UE 504 and/or indicate an RRC connection request) in the msgB 530. For example, the base station 502 may include the unique ID of the UE 504 on the PDSCH of the msgB 530. According to on such configuration, the inclusion of the unique ID of the UE 504 may function as a contention resolution message (e.g., a contention resolution ID). In an additional or alternative configuration, the inclusion of the unique ID of the UE 504 in the msgB 530 may acknowledge successful payload processing 528 of the payload 522b of the msgA 522.

The base station 502 may transmit the msgB 530 to the UE 504 in a RAR window, which may correspond to the RA-RNTI and/or modified RNTI corresponding to the preamble 522a. When the UE 504 is monitoring in the RAR window, the UE 504 may receive the msgB 530. In one configuration, the UE 504 may unscramble the CRC of DCI of the msgB 530 in order to determine the msgB 530 is intended for the UE 504 and, further, to receive acknowledgement that the preamble detection 526 was successful. In another configuration, the UE 504 may detect the unique ID of the UE 504 in the msgB 530, which may indicate acknowledgement of successful payload processing 528 (and, optionally, indicate acknowledgement of successful preamble detection 526). Accordingly, the UE 504 may acquire uplink timing synchronization When the msgB 530 is successfully received and processed by the UE 504.

Figure 6:
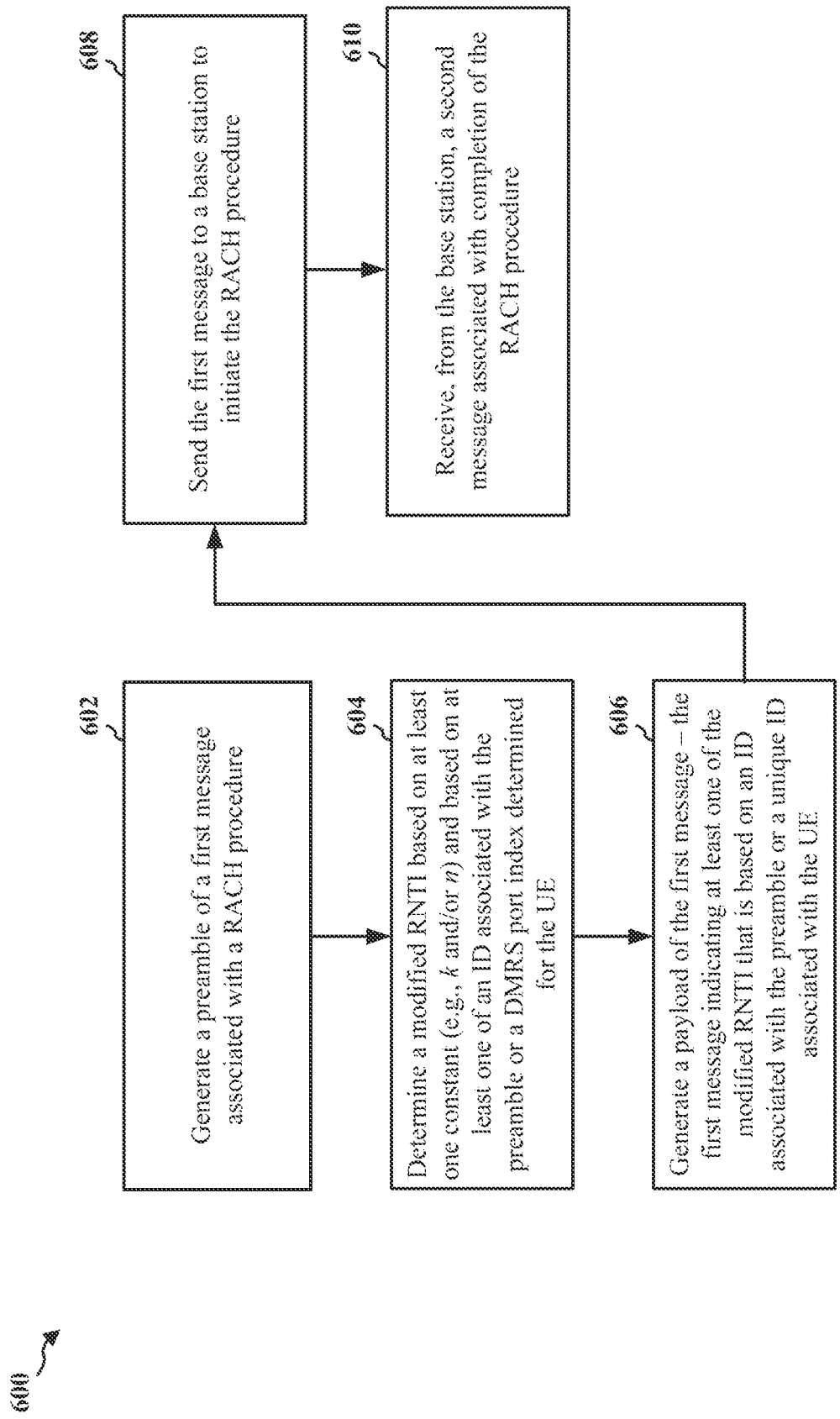
FIG. 6 is a flowchart of a method of wireless communication by a UE.

FIG. 6 is a flowchart of a method 600 of wireless communication. The method may be performed by a UE (e.g., the UE 104, 350, 404, 504; the apparatus 802/802'; the processing system 914 which may include the memory 360 and which may be the entire UE 104, 350, 404, 504 or a component of the UE 104, 350, 404, 504, such as the TX processor 368, the RX processor 356, and/or the controller processor 359). According to various aspects, one or more of the illustrated operations of the method 600 may be transposed, omitted, and or contemporaneously performed.

At operation 602, the UE may generate a preamble of a first message associated with a two-step RACH procedure. For example, the UE may receive information from a base station associated with RACH procedures (e.g., a root sequence index, a zero correlation zone config value, and so forth, which may be included in a SIB). The UE may determine a base sequence from a root sequence index, for example, based on information received from the base station. The UE may then apply at least one cyclic shift to the base sequence, for example, based on information received from the base station. The UE may determine the preamble from one of the cyclically shifted base sequences. Referring to FIG. 5, the UE 504 may generate the preamble 522a of the msgA 522.

At operation 604, the UE may determine a modified RNTI based on at least one constant(e.g., k and/or n) and based on at least one of an ID associated with the preamble or a DMRS port index determined for the UE (e.g., an uplink DMRS port index may be considered to have a one-to-one correspondence with a downlink DMRS port index at the base station). For example, the UE may determine the at least one constant, and then the UE may calculate the modified RNTI using an equation that considers the determined at least one constant and further considers at least one of an ID associated with the preamble or a DMRS port index determined for the UE.

In some aspects, the UE may determine the modified RNTI based on an index of a first symbol of a PRACH occasion (s_id), an index of a first slot of the PRACH occasion in a system frame (t_id), an index of the PRACH occasion in a frequency domain (f_id), and an uplink earlier used for transmission of the preamble (uplink_carrier_id), as well as at least one constant (e.g., k and/or n) and at least one of the Id associated with the preamble (preamble_id) and/or a DMRS port index selected by the UE (DMRS_id). In one aspect, the at least one constant comprises at least one of a first constant k associated with the preamble_id and/or a second constant n associated with the DMRS_id. In one aspect, the modified RNTI may be determined based on a hash of at least one of the preamble_id and/or the DMRS_id. In the context of FIG. 5, the UE 504 may determine a modified RNTI based on at least one constant (e.g., k and/or n) and based on at least one of an ID associated with the preamble 522a and/or a DMRS port index determined for the UE 504 (e.g., an uplink DMRS port index may be considered to have a one-to-one correspondence with a downlink DMRS port index at the base station 502).

At operation 606, the UE may generate a payload of the first message. For example, the UE in determine information to be included in the payload of the fast message, and then the UE may encode the determined information in the payload of the first message. According to various configurations, the first message may indicate at least one of the modified RNTI that is based on an ID associated with the preamble and/or a unique ID associated with the UE. In one aspect, the UE may transmit the unique ID associated with the UE on a PUSCH for the payload of the first message. According to one configuration, the unique ID associated with the UE may comprise a C-RNTI when the UE is operating in an RRC Connected or RRC Inactive mode. In another configuration, the unique ID associated with the UE may comprise one of an S-TMSI, an IMSI, and/or a corenetwork. UE ID when the UE is operating in an RRC Idle mode. In still another configuration, the first Message may identify the UE to the base station based on the ID associated with the preamble and/or an uplink DMRS port index that is specific to the UE. In the context of FIG. 5, the UE 504 may generate the payload 522b of the msgA 523.

At operation 608, the UE may send the first message (including the preamble and the payload) to the base station to initiate a two-step RACH procedure. In the context of FIG. 5, the UE 504 may transmit the msgA 522 (including the preamble 522a and the payload 522b) to the base station 502 to initiate a two-step RACH procedure.

At operation 610, the UE may receive, from the base station, a second message associated with completion of the two-step RACH procedure. In one configuration, the second message comprises DCI having a CRC that is scrambled based on the modified RNTI, and the preamble of the first message is acknowledged by the base station based on the scrambled CRC. In another configuration, the second message indicates the unique ID associated with the UE on a PDSCH, and the preamble and the payload of the first message are acknowledged by the base station based on the indication of the unique ID associated with the UE on the PDSCH. In on configuration, the UE receives the second message on to set of resources that is allocated based on the ID associated with the preamble. In the context of FIG. 5, the UE 504 may receive the msgB 530 from the base station 502 to complete the two-step RACH procedure.

Figure 7:
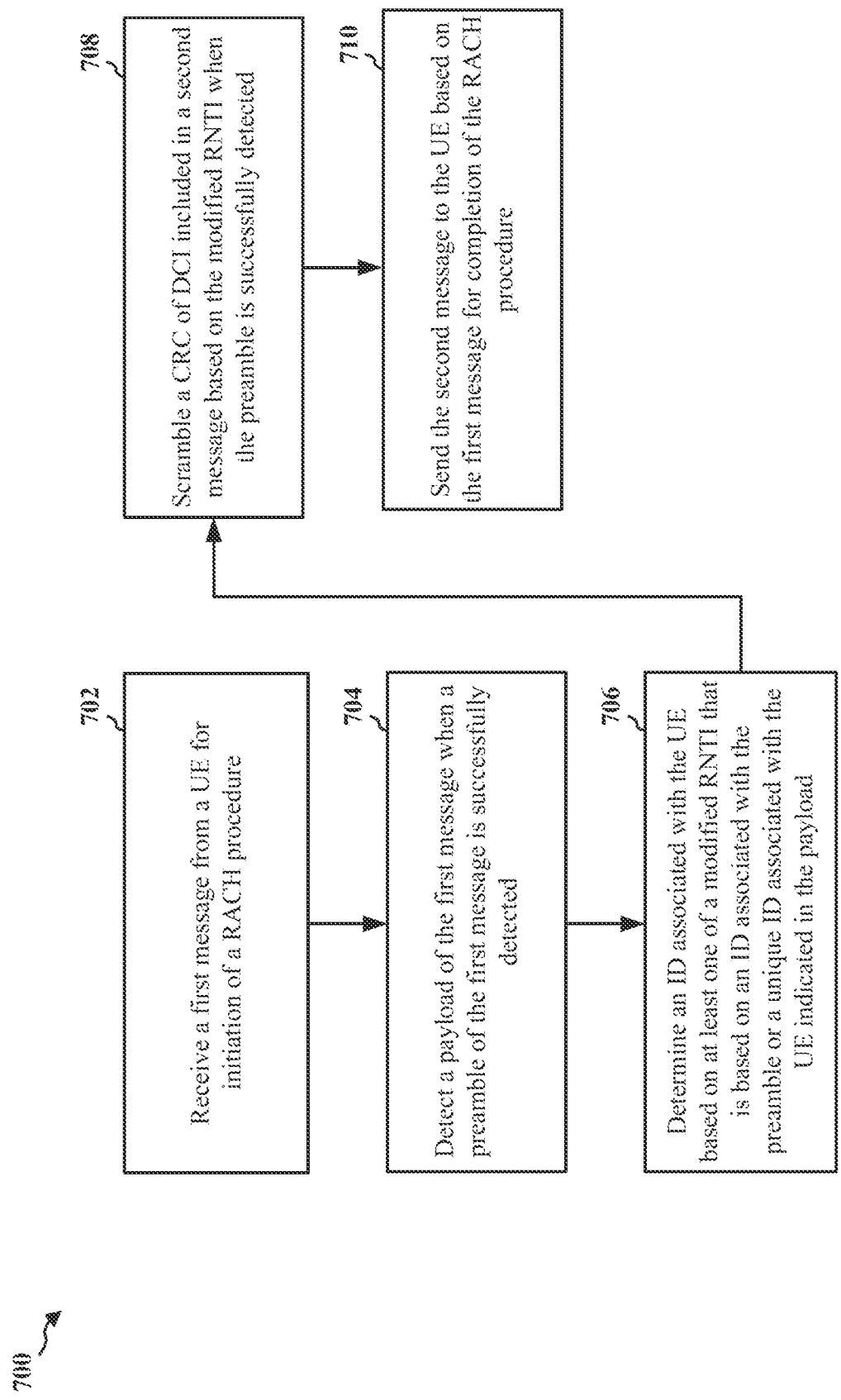
FIG. 7 is a flowchart of a method of wireless communication by a base station.

FIG. 7 is a flowchart of a method 700 of wireless communication. The method may be performed by a base station (e.g., the base station 102/180, 310, 402, 502; the apparatus 1002/1002'; the processing system 1114, which may include the memory 376 and which may be the entire base station 102/180, 310, 402, 502 or a component of the base station 102/180, 310, 402, 502, such as the TX processor 316, the RX processor 370, and/or the controller/processor 375). According to various aspects, one or more of the illustrated operations of the method 700 may be transposed, omitted, and/or contemporaneously performed.

At operation 702, the base station may receive a first message from a UE for initiation of a two-step RACH procedure. In one configuration, the first message may identify the UE to the base station based on an ID associated with a preamble of the first message and/or an uplink DMRS port index that is specific to the UE. In the context of FIG. 5, the base station 502 may receive the msgA 522 (including the preamble 522a and the payload 522b) from the UE 504 for initiation of as two-step RACH procedure.

At operation 704, the base station may detect a payload of the first message when a preamble of the first message is successfully detected. For example the base station may decode the first message, and the base station identify information from the decoded first message corresponding to the payload. In one configuration, a unique ID associated with the UE may be indicated in the payload and may be carried on a PUSCH. In the context of FIG. 5, the base station 502 may perform payload processing 528 of the payload 522b of the msgA 522 when the preamble detection 526 of the preamble 522a of the msgA 522 is successful.

At operation 706, the base station may determine an ID associated with the UE based on at least one of a modified RNTI that is based on an ID associated with the preamble of the first message and/or a unique ID associated with the UE indicated in the payload of the first message. For example, the base station may determine a set of values upon which the ID associated with the UE may be based (e.g., an index of a symbol, an index of a slot, etc.), and then the base station may calculate the ID associated with the UE using an equation an that considers the determined set of values. In one configuration, the modified RNTI may be based on an index of a first symbol of a PRACH occasion (s_id), an index of a first slot of the PRACH occasion in a system frame (t_id), an index of the PRACH occasion in a frequency domain (f_id), and an uplink carrier used for transmission of the preamble (uplink_carrier_id), as well as at least one constant (e.g., k and/or n) and at least one of the ID associated with the preamble (preamble_id) and/or a DMRS port index selected by the UE (DMRS_id). In one aspect, the at least one constant comprises at least one of a first constant k associated with the preamble_id and/or a second constant n associated with the DMRS_id. In one aspect, the modified RNTI may be determined based on a hash of at least one of the preamble_id and/or the DMRS_id.

According to various configurations, the unique ID associated with the UE may comprise a C-RNTI when the UE is operating in an RRC Connected or RRC inactive mode. In another configuration, the unique ID associated with the UE may comprise one of an S-TMSI, an IMSI, and/or a core-network UE ID when the UE is operating in an RRC Idle mode. In still another configuration, the first message may identify the UE to the base station based on the ID associated with the preamble and/or an uplink DMRS port index that is specific to the UE (e.g., the uplink DMRS port index may be considered to have a one-to-one correspondence with a downlink DMRS port index at the base station).

In the context of FIG. 5, the base station 502 may determine an ID associated with the UE 504 based on at least one of a modified RNTI that is based on an ID associated with the preamble 522a of the msgA 522 and/or a unique ID associated with the UE 504 indicated in the payload 522b of the msgA 522.

At operation 708, the base station may scramble a CRC of DCI included in a second message based on the modified RNTI ashen the preamble is successfully detected. For example, the base station may generate a CRC based on at least the DCI, and then the base station may encode the CRC based on the modified RNTI (e.g., using an algorithm or function that considers the modified RNTI). In the context of FIG. 5, the base station 502 may scramble a CRC of DCI included in the msgB 530 based on the modified RNTI when the preamble detection 526 of the preamble 522a of the msgA 522 is successful.

At operation 710, the base station may send the second message to the UE based on the first message for completion of the two-step RACH procedure. In on configuration, the second message indicate the unique ID associated with the UE on a PDSCH when the preamble and the payload of the first message are successfully detected. In another configuration, the second message is transmitted on a set of resources that is allocated based on the ID associated with the preamble. In the context of FIG. 5, the base station 502 may send the msgB 530 to the UE 504 based on the msgA 522 for completion of the two-step RACH procedure.

Figure 8:
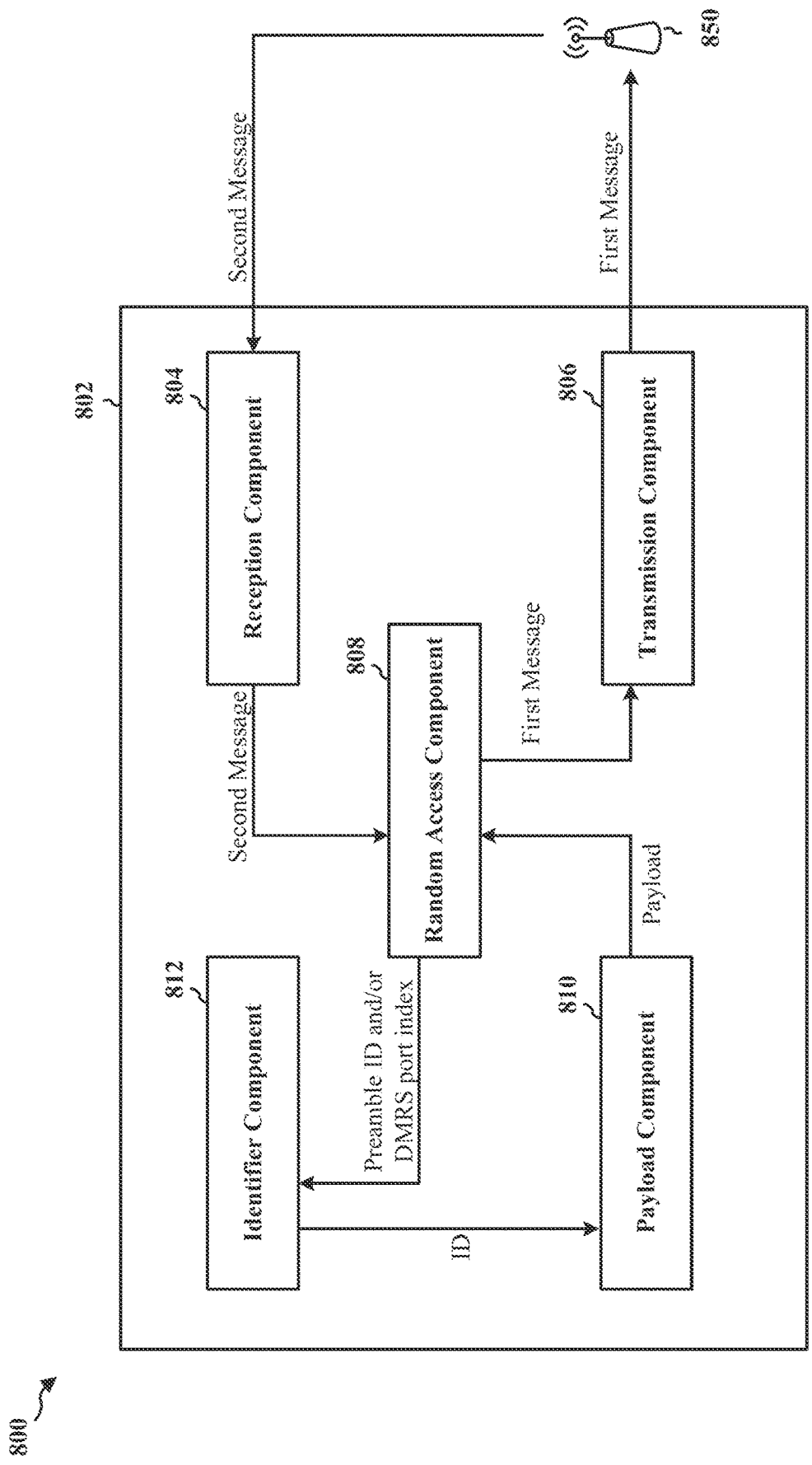
FIG. 8 is a conceptual data flow diagram illustrating the data flow between different means/components in an example apparatus.

FIG. 8 is a conceptual data flow diagram illustrating the data flow 800 between different means/components in an example apparatus 802. The apparatus 802 may be a UE. The apparatus 802 may include a random access component 808 that generates a preamble of a first message associated with a RACH procedure, e.g., as described in connection with operation 602 of FIG. 6. In some aspects, the random access component 808 may further select a port index associated with a DMRS to uniquely identify the apparatus 802 in the RACH procedure. For is the port index may be associated with at least one DMRS to be transmitted with the first message for the RACH procedure.

The apparatus 802 may further include an identifier component 812 that determines an ID associated with the apparatus 802 based on at least one of an ID associated with the preamble and/or a port index associated with a DMRS, e.g., as described in connection with operation 604 of FIG. 6. For example, the ID associated with the apparatus 802 may be a modified RNTI, which may uniquely identify the apparatus to a base station 850 in the RACH procedure.

According to various aspects, the identifier component 812 may further determine the ID associated with the apparatus 802 based on at least one of an index of a first symbol of a PRACH occasion s_id, an index of a first slot of the PRACH occasion in a system frame t_id, an index of the PRACH occasion in a frequency domain f_id, an uplink carrier used for transmission of the preamble uplink_carrier_id, and/or at least one constant. The at least one constant may include at least one of a first constant k that is associated with the ID associated with the preamble and/or a second constant n that is associated with the port index associated with the DMRS. In some aspects, the identifier component 812 may determine the ID associated with the apparatus 802 based on a hash of at least one of the ID associated with the preamble and/or the port index associated with the DMRS.

The apparatus 802 may further include a payload component 810 that generates as payload of the first message to indicate the ID associated with the apparatus 802, e.g., as described in connection with operation 606 of FIG. 6. In some aspects, the payload component 810 may cause the payload indicating the ID associated with the apparatus 802 to be carried on a PUSCH.

The apparatus 802 may further include a transmission component 806 that is configured to transmit the first message indicating the ID associated with the apparatus 802 to the base station 850 to initiate the RACH procedure, e.g., as described in connection with operation 608 of FIG. 6. The apparatus 802 may further include a reception component 804 that is configured to receive a second message associated with completion of the RACH procedure from the base station 850, e.g., as described in connection with operation 610 of FIG. 6. For example, the second message may be associated with completion of the RACH procedure in that the RACH procedure may be completed when the transmission component 806 transmits acknowledgement (ACK) feedback to the base station 850 in response to successfully receiving the second message.

In some aspects, the second message includes information confirming the ID associated with the apparatus 802. In some further aspects, the information confirming the ED associated with the apparatus 802 is included in a MAC control element (CE) of the second message. In some other aspects, the second message may include a contention resolution message.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
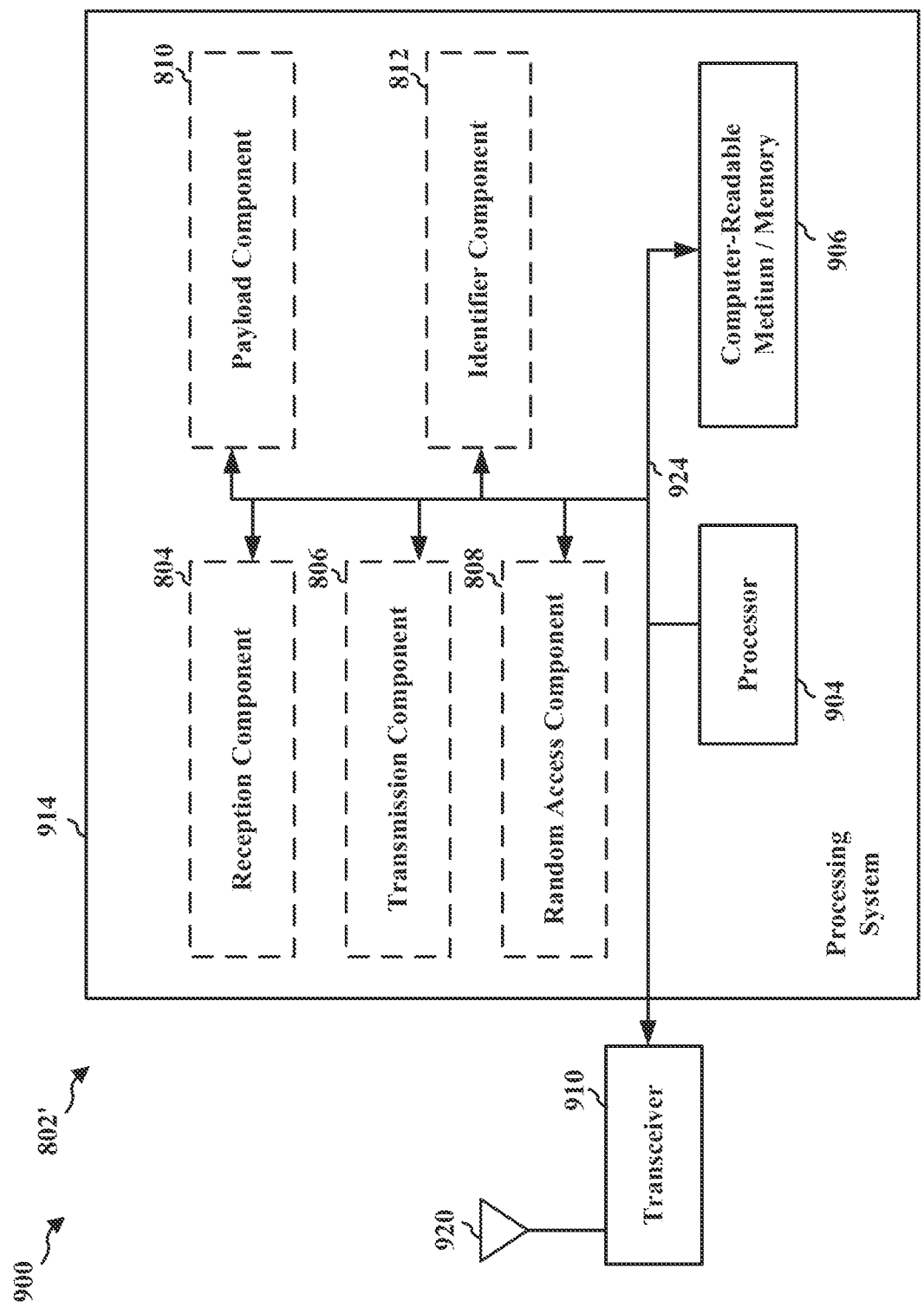
FIG. 9 is a diagram illustrating an example of a hardware implementation for an apparatus employing as processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, and the computer-readable medium/memory 906. The bus 924 may also link various other circuits such as timing sources, peripherals, voltage regulators, and power management circuits, which are well known in the art, and therefore, not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium memory 906. The processor 904 is responsible for general processing, including the execution of software stored on the computer-readable medium memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812. The components may be software components running in the processor 904, resident/stored in the computer readable medium/memory 906 one or more hardware components coupled to the processor 904, or some combination thereof. The processing system 914 may be a component of the UE 350 and may include the memory 860 and/or at least one of the TX processor 368, the RX processor 356, and the controller/processor 359. Alternatively, the processing system 914 may be the entire UE (e.g., see 350 of FIG. 3).

In one configuration, the apparatus 802/802' for wireless communication includes means for generating a preamble of a first message associated with a RACH procedure; means for determining an ID associated with the apparatus 802/802' based on at least one of an ID associated with the preamble or a port index associated with a DMRS; means for generating a payload of the first message that indicates the ID associated with the apparatus 802/802'; and means for transmitting the first message to a base station to initiate the RACH procedure.

In some aspects, the ID associated with the apparatus 802/802' is determined further based on at least one of: an index of a first symbol of a physical RACH (PRACH) occasion s_id, an index of a first slot the PRACH occasion in a system frame t_id, an index of the PRACH occasion in a frequency domain_id, an uplink carrier used for transmission of the preamble uplink_carrier_id, or at least one constant. In some further aspects, the at least one constant comprises at least one of a first constant k associated with the ID associated with the preamble or a second constant n associated with the port index associated with the DMRS.

In some aspects, the ID associated with the apparatus 802/802' is determined based on a hash of at least one of the ID associated with the preamble or the port index associated with the DMRS. In some other aspects, the payload indicating the ID associated with the apparatus 802/802' is carried on a PUSCH. In some additional aspects, the ID associated with the apparatus 802/802' comprises a modified RNTI that uniquely identifies the apparatus 802/802' in the RACH procedure. In some further aspects, the port index associated with the DMRS is selected by the apparatus 802/802' to uniquely identify the apparatus 802/802' in the RACH procedure.

The apparatus 802/802' may further include means for receiving, from the base station based on the first message, a second message associated with completion of the RACH procedure. In some aspects, the second message includes information confirming the ID associated with the apparatus 802/802'. In some further aspects, the information confirming the ID associated with the apparatus 802/802' is included in a MAC CE of the second message. In some other aspects, the second message comprises a contention resolution message.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356 and the controller/processor 359 configured to perform the functions recited by the aforementioned means.

Figure 10:
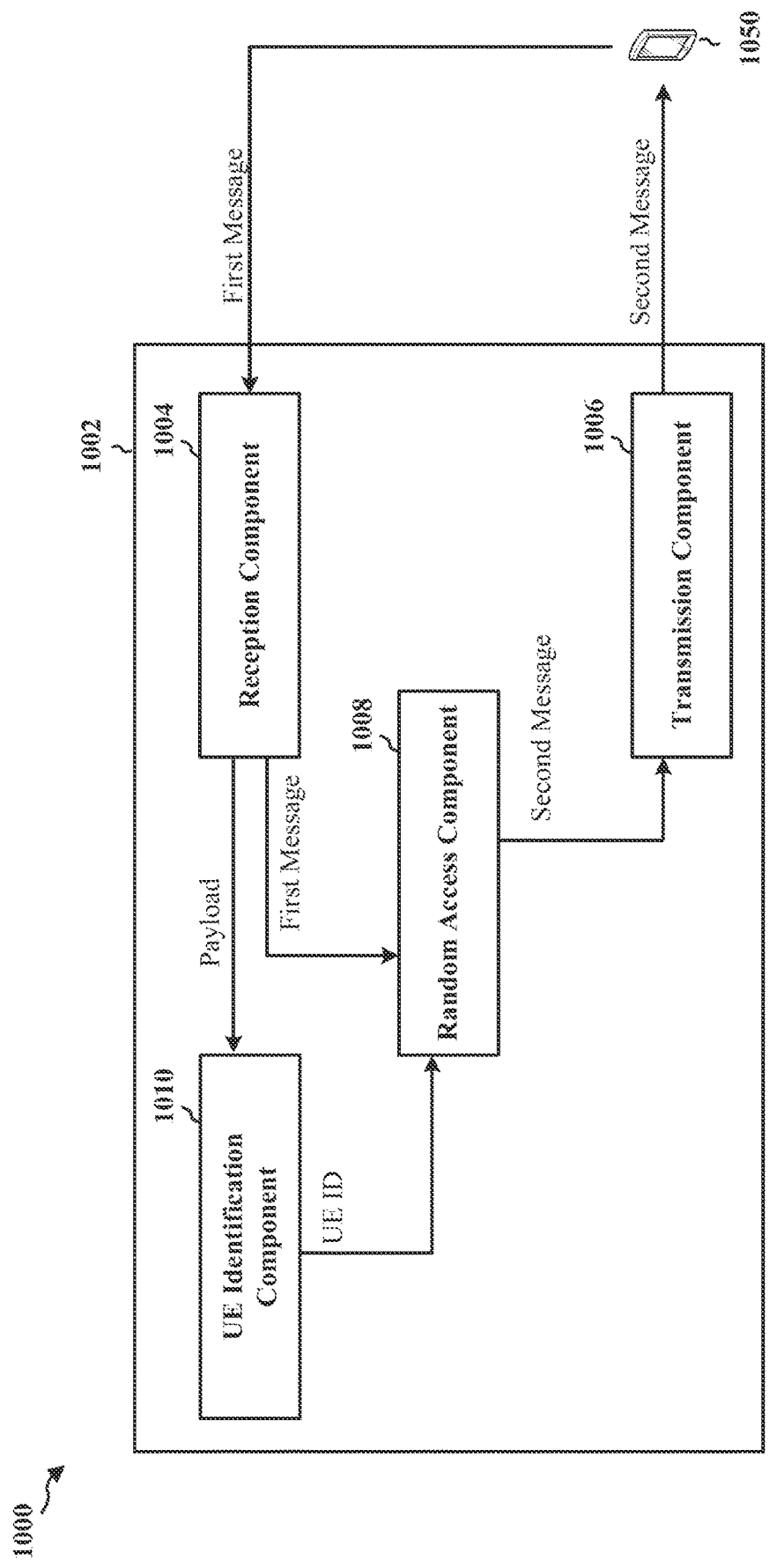
FIG. 10 is a conceptual data flow diagram illustrating the data flow between different means/components in an example apparatus.

FIG. 10 is a conceptual data flow diagram illustrating the data flow 1000 between different means/components in an example apparatus 1002. The apparatus 1002 may be a base station. The apparatus 1002 may include a reception component 1004 that receives a first message including a preamble from a UE 1050 for initiation of a RACH procedure, e.g., as described in connection with operation 702 of FIG. 7.

The apparatus 1002 may further include a UE identification component 1010 that detects a payload of the first message when the preamble of the first message is successfully received, e.g., as described in connection with operation 704 of FIG. 7. The UE identification component 1010 may further determine an ID associated with the UE 1050 based on the first message, e.g., as described in connection with operation 706 of FIG. 7. The ID associated with the UE 1050 may be based on at least one of an ID associated with the preamble and/or a port index of a DMRS associated with the first message. For example, the ID as with the UE 1050 may be a modified RNTI that uniquely identifies the UE 1050 in the RACH procedure. Potentially, the port index of the DMRS associated with the first message uniquely identifies the UE 1050 in the RACH procedure. In some aspects, the UE identification component 1010 may detect the ID associated with the UE 1050 in a payload of the first message that indicates the ID associated with the UE 1050 and is carried on a PUSCH.

In some aspects, the ID associated with the UE 1050 may be further based on at least one of an index of a first symbol of a PRACH occasion s_id, an index of a first slot of the PRACH occasion in a system frame t_id, an index of the RACH occasion in a frequency domain f_id, an uplink carrier used for transmission of the preamble uplink_carrier_id and/or at last one constant. The at least one constant may include at least one of a first constant k that is associated with the ID associated with the preamble and/or a second constant n that is associated with the port index associated with the DMRS. In some other aspects, the ID associated with the UE 1050 may be based on a hash of at least one of the ID associated with the preamble and/or the port index associated with the DMRS.

The apparatus 1002 may further include a random access component 1008 that may scramble a CRC of DCI included in a second message based on the ID associated with the UE 1050 when the preamble is successfully detected e.g. as described in connection with operation 708 of FIG. 7. The random access component 1008 may generate the second message. The random access component 1008 may include information confirming the ID associated with the UE 1050 in the second message. For example, the random access component 1008 may include information confirming the ID associated with the UE 1050 in a MAC CE of the second message. In some aspects, the second message may include a contention resolution message.

The apparatus 1002 may further include a transmission component 1006 that transmits, to the UE 1050 based on the first message, the second message indicating the ID associated with the UE 1050 for the RACH procedure. The second message may be associated with completion of the RACH procedure (e.g., the RACH procedure may be completed when ACK feedback is received from the UE 1050 in response to the second message).

The apparatus may include additional components that perform each of the blocks of the algorithm in the aforementioned flowchart of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
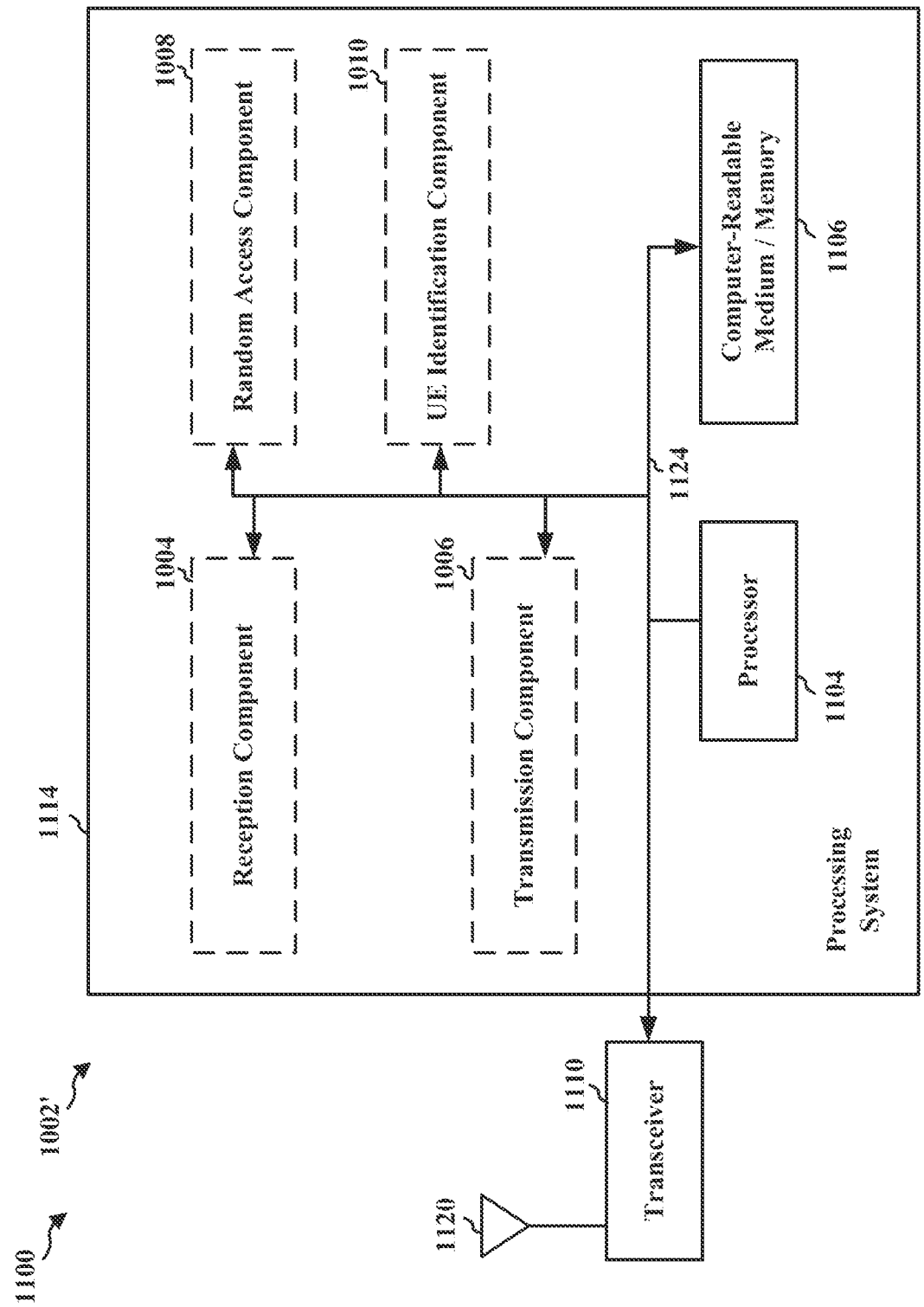
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium memory 1106. The processor 1104 is responsible for general processing, including the execution of software stored on the computer-readable medium memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010. The components may be software components running in the processor 1104, resident/stored in the computer readable medium memory 1106, one or more hardware components coupled to the processor 1114, or some combination thereof. The processing system 1114 may be a component of the base station 310 and may include the memory 376 and/or at least one of the TX processor 316, the RX processor 370, and the controller/processor 375. Alternatively, the processing system 1114 may be the entire base station (e.g., see 310 of FIG. 3).

In one configuration, the apparatus 1002/1002' for wireless communication includes means for receiving, a first message including a preamble from a UE for initiation of a RACH procedure; means for determining an ID associated with the UE based on the first message, the ID associated with the UE being based on at least one of an ID associated with the preamble or a port index of a DMRS associated with the first message; and means for transmitting, to the UE based on the first message, a second message indicating the ID associated with the UE for the RACH procedure.

In seine aspects, the ID associated with the UE is further based on at least one of: an index of a first symbol of a physical RACH (PRACH) occasion s_id, an index of a first slot of the PRACH occasion in a system frame t_id, an index of the PRACH occasion in a frequency domain f_id, an uplink carrier used for transmission of the preamble uplink_carrier_id, or at least one constant. In some further aspects, the at least one constant comprises at least one of a first constant k associated with the ID associated with the preamble or a second constant n associated with the port index associated with the DMRS. In some other aspects, the ID associated with the UE is based on a hash of at least one of the ID associated with the preamble or the port index associated with the DMRS.

In some aspects, the ID associated with the UE is indicated in a payload of the first message that is carried on a PUSCH. In some further aspects, the ID associated with the UE comprises a modified RNTI that uniquely identifies the UE in the RACH procedure. In some aspects, the port index of the DMRS uniquely identifies the UE in the RACH procedure. In some aspects, the second message is associated with completion of the RACH procedure. In some other aspects, the second message includes information confirming the ID associated with the UE. In still further aspects, the information confirming the ID associated with the UE may be included in a media access control (MAC) control element (CE) of the second message. Potentially, the second message comprises a contention resolution message.

The aforementioned means may be one or more of the aforementioned components of the apparatus 1002 and or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned as may be the TX Processor 316, the RX Processor 370, and the controller/processor 375 configured to perform the functions recited by the aforementioned means.

It is understood that the specific order or hierarchy of blocks in the processes flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration," Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, C," "one or more of A, B, or C, " "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), the method comprising:
    generating a preamble of a first message associated with a random access channel (RACH) procedure;
    determining an identifier (ID) associated with the UE based on at least one of an ID associated with the preamble or a port index associated with a demodulation reference signal (DMRS);
    generating a payload of the first message that indicates the ID associated with the UE;
    transmitting the first message to a base station to initiate the RACH procedure; and
    receiving, from the base station based on the first message, a second message associated with completion of the RACH procedure and including information confirming the ID associated with the UE.

2. The method of claim 1, wherein the ID associated with the UE is determined further based on at least one of:
    an index of a first symbol of a physical RACH (PRACH) occasion s_id,
    an index of a first slot of the PRACH occasion in a system frame t_id,
    an index of the PRACH occasion in a frequency domain f_id,
    an uplink carrier used for transmission of the preamble uplink_carrier_id, or
    at least one constant.

3. The method of claim 2, wherein the at least one constant comprises at least one of a first constant k associated with the ID associated with the preamble or a second constant n associated with the port index associated with the DMRS.

4. The method of claim 1, wherein the ID associated with the UE is determined based on a hash of at least one of the ID associated with the preamble or the port index associated with the DMRS.

5. The method of claim 1, wherein the payload indicating the ID associated with the UE is carried on a physical uplink shared channel (PUSCH).

6. The method of claim 1, wherein the ID associated with the UE comprises a modified radio network temporary identifier (RNTI) that uniquely identifies the UE in the RACH procedure.

7. The method of claim 1, wherein the port index associated with the DMRS is selected by the UE to uniquely identify the UE in the RACH procedure.

8. The method of claim 1, wherein the information confirming the ID associated with the UE is included in a media access control (MAC) control element (CE) of the second message.

9. The method of claim 1, wherein the second message comprises a contention resolution message.

10. A method of wireless communication by a base station, the method comprising:
    receiving a first message including a preamble from a user equipment (UE) for initiation of a random access channel (RACH) procedure;
    determining an identifier (ID) associated with the UE based on the first message, the ID associated with the UE being based on at least one of an ID associated with the preamble or a port index of a demodulation reference signal (DMRS) associated with the first message; and
    transmitting, to the UE based on the first message, a second message associated with completion of the RACH procedure and including information confirming the ID associated with the UE for the RACH procedure.

11. The method of claim 10, wherein the ID associated with the UE is further based on at least one of:
- an index of a first symbol of a physical RACH (PRACH) occasion s_id,
- an index of a first slot of the PRACH occasion in a system frame t_id,
- an index of the PRACH occasion in a frequency domain f_id,
- an uplink carrier used for transmission of the preamble uplink_carrier_id, or
- at least one constant.

12. The method of claim 11, wherein the at least one constant comprises at least one of a first constant k associated with the ID associated with the preamble or a second constant n associated with the port index associated with the DMRS.

13. The method of claim 10, wherein the ID associated with the UE is based on a hash of at least one of the ID associated with the preamble or the port index associated with the DMRS.

14. The method of claim 10, wherein the ID associated with the UE is indicated in a payload of the first message that is carried on a physical uplink shared channel (PUSCH).

15. The method of claim 10, wherein the ID associated with the UE comprises a modified radio network temporary identifier (RNTI) that uniquely identifies the UE in the RACH procedure.

16. The method of claim 10, wherein the port index of the DMRS uniquely identifies the UE in the RACH procedure.

17. The method of claim 10, wherein the information confirming the ID associated with the UE is included in a media access control (MAC) control element (CE) of the second message.

18. The method of claim 10, wherein the second message comprises a contention resolution message.

19. An apparatus for wireless communication by a user equipment (UE), the apparatus comprising:
- means for generating a preamble of a first message associated with a random access channel (RACH) procedure;
- means for determining an identifier (ID) associated with the UE based on at least one of an ID associated with the preamble or a port index associated with a demodulation reference signal (DMRS);
- means for generating a payload of the first message that indicates the ID associated with the UE;
- means for transmitting the first message to a base station to initiate the RACH procedure; and
- means for receiving, from the base station based on the first message, a second message associated with completion of the RACH procedure,
- wherein the second message includes information confirming the ID associated with the UE.

20. The apparatus of claim 19, wherein the ID associated with the UE is determined further based on at least one of:
- an index of a first symbol of a physical RACH (PRACH) occasion s_id,
- an index of a first slot of the PRACH occasion in a system frame t_id,
- an index of the PRACH occasion in a frequency domain f_id,
- an uplink carrier used for transmission of the preamble uplink_carrier_id, or
- at least one constant.

21. The apparatus of claim 20, wherein the at least one constant comprises at least one of a first constant k associated with the ID associated with the preamble or a second constant n associated with the port index associated with the DMRS.

22. The apparatus of claim 19, wherein the ID associated with the UE is determined based on a hash of at least one of the ID associated with the preamble or the port index associated with the DMRS.

23. The apparatus of claim 19, wherein the payload indicating the ID associated with the UE is carried on a physical uplink shared channel (PUSCH).

24. The apparatus of claim 19, wherein the ID associated with the UE comprises a modified radio network temporary identifier (RNTI) that uniquely identifies the UE in the RACH procedure.

25. The apparatus of claim 19, wherein the port index associated with the DMRS is selected by the UE to uniquely identify the UE in the RACH procedure.

26. The apparatus of claim 19, wherein the information confirming the ID associated with the UE is included in a media access control (MAC) control element (CE) of the second message.

27. The apparatus of claim 19, wherein the second message comprises a contention resolution message.

28. An apparatus for wireless communication by a base station, the apparatus comprising:
- means for receiving a first message including a preamble from a user equipment (UE) for initiation of a random access channel (RACH) procedure;
- means for determining an identifier (ID) associated with the UE based on the first message, the ID associated with the UE being based on at least one of an ID associated with the preamble or a port index of a demodulation reference signal (DMRS) associated with the first message; and
- means for transmitting, to the UE based on the first message, a second message indicating the ID associated with the UE for the RACH procedure,
- wherein the second message is associated with completion of the RACH procedure and includes information confirming the ID associated with the UE.

29. The apparatus of claim 28, wherein the ID associated with the UE is further based on at least one of:
- an index of a first symbol of a physical RACH (PRACH) occasion s_id,
- an index of a first slot of the PRACH occasion in a system frame t_id,
- an index of the PRACH occasion in a frequency domain f_id,
- an uplink carrier used for transmission of the preamble uplink_carrier_id, or
- at least one constant.

30. The apparatus of claim 29, wherein the at least one constant comprises at least one of a first constant k associated with the ID associated with the preamble or a second constant n associated with the port index associated with the DMRS.

31. The apparatus of claim 28, wherein the ID associated with the UE is based on a hash of at least one of the ID associated with the preamble or the port index associated with the DMRS.

32. The apparatus of claim 28, wherein the ID associated with the UE is indicated in a payload of the first message that is carried on a physical uplink shared channel (PUSCH).

33. The apparatus of claim 28, wherein the ID associated with the UE comprises a modified radio network temporary identifier (RNTI) that uniquely identifies the UE in the RACH procedure.

34. The apparatus of claim 28, wherein the port index of the DMRS uniquely identifies the UE in the RACH procedure.

35. The apparatus of claim 28, wherein the information confirming the ID associated with the UE is included in a media access control (MAC) control element (CE) of the second message.

36. The apparatus of claim 28, wherein the second message comprises a contention resolution message.

37. An apparatus for wireless communication by a user equipment (UE), the apparatus comprising:
a memory; and
at least one processor coupled to the memory and configured to:
generate a preamble of a first message associated with a random access channel (RACH) procedure;
determine an identifier (ID) associated with the UE based on at least one of an ID associated with the preamble or a port index associated with a demodulation reference signal (DMRS);
generate a payload of the first message that indicates the ID associated with the UE;
transmit the first message to a base station to initiate the RACH procedure; and
receive, from the base station based on the first message, a second message associated with completion of the RACH procedure,
wherein the second message includes information confirming the ID associated with the UE.

38. The apparatus of claim 37, wherein the ID associated with the UE is further based on at least one of:
an index of a first symbol of a physical RACH (PRACH) occasion s_id,
an index of a first slot of the PRACH occasion in a system frame t_id,
an index of the PRACH occasion in a frequency domain f_id,
an uplink carrier used for transmission of the preamble uplink_carrier_id, or
at least one constant.

39. The apparatus of claim 38, wherein the at least one constant comprises at least one of a first constant k associated with the ID associated with the preamble or a second constant n associated with the port index associated with the DMRS.

40. The apparatus of claim 37, wherein the ID associated with the UE is based on a hash of at least one of the ID associated with the preamble or the port index associated with the DMRS.

41. The apparatus of claim 37, wherein the payload indicating the ID associated with the UE is carried on a physical uplink shared channel (PUSCH).

42. The apparatus of claim 37, wherein the ID associated with the UE comprises a modified radio network temporary identifier (RNTI) that uniquely identifies the UE in the RACH procedure.

43. The apparatus of claim 37, wherein the port index associated with the DMRS is selected by the UE to uniquely identify the UE in the RACH procedure.

44. The apparatus of claim 37, wherein the information confirming the ID associated with the UE is included in a media access control (MAC) control element (CE) of the second message.

45. The apparatus of claim 37, wherein the second message comprises a contention resolution message.

46. An apparatus for wireless communication by a base station, the apparatus comprising:
a memory; and
at least one processor coupled to the memory and configured to:
receive a first message including a preamble from a user equipment (UE) for initiation of a random access channel (RACH) procedure;
determine an identifier (ID) associated with the UE based on the first message, the ID associated with the UE being based on at least one of an ID associated with the preamble or a port index of a demodulation reference signal (DMRS) associated with the first message; and
transmit, to the UE based on the first message, a second message indicating the ID associated with the UE for the RACH procedure,
wherein the second message is associated with completion of the RACH procedure and includes information confirming the ID associated with the UE.

47. The apparatus of claim 46, wherein the ID associated with the UE is determined further based on at least one of:
an index of a first symbol of a physical RACH (PRACH) occasion s_id,
an index of a first slot of the PRACH occasion in a system frame t_id,
an index of the PRACH occasion in a frequency domain f_id,
an uplink carrier used for transmission of the preamble uplink_carrier_id, or
at least one constant.

48. The apparatus of claim 47, wherein the at least one constant comprises at least one of a first constant k associated with the ID associated with the preamble or a second constant n associated with the port index associated with the DMRS.

49. The apparatus of claim 46, wherein the ID associated with the UE is determined based on a hash of at least one of the ID associated with the preamble or the port index associated with the DMRS.

50. The apparatus of claim 46, wherein the ID associated with the UE is indicated in a payload of the first message that is carried on a physical uplink shared channel (PUSCH).

51. The apparatus of claim 46, wherein the ID associated with the UE comprises a modified radio network temporary identifier (RNTI) that uniquely identifies the UE in the RACH procedure.

52. The apparatus of claim 46, wherein the port index of the DMRS uniquely identifies the UE in the RACH procedure.

53. The apparatus of claim 46, wherein the information confirming the ID associated with the UE is included in a media access control (MAC) control element (CE) of the second message.

54. The apparatus of claim 46, wherein the second message comprises a contention resolution message.

55. A non-transitory computer-readable medium storing computer-executable code for wireless communication by a user equipment (UE), the code when executed by a processor cause the processor to:
generate a preamble of a first message associated with a random access channel (RACH) procedure;
determine an identifier (ID) associated with the UE based on at least one of an ID associated with the preamble or a port index associated with a demodulation reference signal (DMRS);
generate a payload of the first message that indicates the ID associated with the UE;

transmit the first message to a base station to initiate the RACH procedure; and receive, from the base station based on the first message, a second message associated with completion of the RACH procedure and including information confirming the ID associated with the UE.

56. A non-transitory computer-readable medium storing computer-executable code for wireless communication by a base station, the code when executed by a processor cause the processor to:

receive a first message including a preamble from a user equipment (UE) for initiation of a random access channel (RACH) procedure;

determine an identifier (ID) associated with the UE based on the first message, the ID associated with the UE being based on at least one of an ID associated with the preamble or a port index of a demodulation reference signal (DMRS) associated with the first message; and transmit, to the UE based on the first message, a second message indicating the ID associated with the UE for the RACH procedure, wherein the second message is associated with completion of the RACH procedure and includes information confirming the ID associated with the UE.

* * * * *